United States Patent
Perez

(10) Patent No.: US 10,401,262 B2
(45) Date of Patent: Sep. 3, 2019

(54) BUILDING MANAGEMENT SYSTEM WITH VOTING-BASED FAULT DETECTION AND DIAGNOSTICS

(71) Applicant: Johnson Controls Technology Company, Holland, MI (US)

(72) Inventor: Carlos Felipe Alcala Perez, Lomas de Chapultepec (MX)

(73) Assignee: Johnson Controls Technology Company, Auburn Hills, MI (US)

( * ) Notice: Subject to any disclaimer, the term of this patent is extended or adjusted under 35 U.S.C. 154(b) by 336 days.

(21) Appl. No.: 14/744,761

(22) Filed: Jun. 19, 2015

(65) Prior Publication Data
US 2016/0370258 A1  Dec. 22, 2016

(51) Int. Cl.
*G01M 99/00* (2011.01)

(52) U.S. Cl.
CPC .................. *G01M 99/00* (2013.01)

(58) Field of Classification Search
CPC ....... G01M 99/00; G06Q 10/00; G06Q 30/10; G06N 5/04; G06D 23/19; G06F 1/32; G06F 3/048; G06F 8/65
USPC ........... 702/182; 700/45, 100, 276; 705/412; 715/771
See application file for complete search history.

(56) References Cited

U.S. PATENT DOCUMENTS

| | | | | |
|---|---|---|---|---|
| 2009/0083583 A1* | 3/2009 | Seem | ...................... | F24F 11/006 714/39 |
| 2010/0324962 A1* | 12/2010 | Nesler | .................. | G01R 21/133 705/7.36 |
| 2011/0047418 A1* | 2/2011 | Drees | ...................... | G05B 15/02 714/57 |
| 2012/0022700 A1* | 1/2012 | Drees | ...................... | G05B 15/02 700/276 |
| 2013/0125107 A1* | 5/2013 | Bandakka | ............... | G06F 8/665 717/171 |
| 2013/0190900 A1* | 7/2013 | Seem | ..................... | F25B 49/027 700/47 |

(Continued)

OTHER PUBLICATIONS

Li, et al., Generalized reconstruction-based contributions for output-relevant fault diagnosis with application to the Tennessee Eastman process, IEEE Transactions on Control Systems Technology, vol. 19, No. 5, Sep. 2011, 14 pages.

(Continued)

*Primary Examiner* — Dzung Tran
(74) *Attorney, Agent, or Firm* — Foley & Lardner LLP

(57) ABSTRACT

A building management system includes sensors configured to measure a plurality of monitored variables and fault detection and diagnosis (FDD) system configured to identify an operating state associated with the monitored variables. The FDD system includes a communications interface configured to receive samples of the monitored variables from the plurality of sensors. The FDD system includes a direction extractor configured to use locations, in a multidimensional modeling space, of a plurality of stored operating states to extract a direction from each of the stored operating states to each of the other stored operating states. The FDD system includes a fault diagnoser configured to use the extracted directions in a voting-based diagnosis to determine an operating state for each of the samples of the monitored variables.

20 Claims, 12 Drawing Sheets

(56) References Cited

U.S. PATENT DOCUMENTS

2014/0282458 A1* 9/2014 Gupta ...................... G06F 8/65
717/168

OTHER PUBLICATIONS

Ng, et al., Multi-agent based collaborative fault detection and identification in chemical processes, Engineering Applications of Artificial Intelligence, vol. 23, No. 6, Sep. 2010, 16 pages.
Qin, S.J., Statistical process monitoring: basics and beyond, Journal of Chemometrics, vol. 17, No. 8-9, Aug.-Sep. 2003, 23 pages.
Yue, et al., Reconstruction based fault identification using a combined index, Industrial & Engineering Chemistry Research, vol. 40, No. 20, Oct. 2001, 12 pages.

* cited by examiner

BUILDING MANAGEMENT SYSTEM WITH VOTING-BASED FAULT DETECTION AND DIAGNOSTICS

BACKGROUND

The present invention relates generally to building management systems. The present invention relates more particularly to fault detection and diagnostics in a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Systems and devices in a BMS often generate temporal (i.e., time-series) data that can be analyzed to determine the performance of the BMS and the various components thereof. The data generated by the BMS may include measured or calculated values that exhibit statistical characteristics and provide information about how the corresponding system or process (e.g., a temperature control process, a flow control process, etc.) is performing in terms of error from its setpoint. These data can be examined by a fault detection and diagnosis (FDD) system to expose when the monitored system or process begins to degrade in performance and alert a user to repair the fault before it becomes more severe.

SUMMARY

One implementation of the present disclosure is a building management system (BMS). The BMS includes a plurality of sensors configured to measure a plurality of monitored variables in the BMS. The BMS further includes a fault detection and diagnosis (FDD) system. The FDD system includes a communications interface configured to receive samples of the monitored variables from the plurality of sensors. The FDD system includes a direction extractor configured to use locations, in a multidimensional modeling space, of a plurality of stored operating states to extract a direction from each of the stored operating states to each of the other stored operating states. The FDD system includes a fault diagnoser configured to use the extracted directions in a voting-based diagnosis to determine an operating state for each of the samples of the monitored variables.

In some embodiments, the voting-based diagnosis includes iteratively selecting each of the stored operating states. The voting-based diagnosis may include recording, for each selected operating state, a vote for one or more of the other operating states for which the direction from the selected operating state to the other operating state is similar to a direction from the selected operating state to the sample. The voting-based diagnosis may include identifying the sample as belonging to the operating state with the most votes.

In some embodiments, the FDD system further includes a modeler configured to generate a plurality of models describing the plurality of stored operating states. Each model may define the location of one of the stored operating states in the multidimensional modeling space. In some embodiments, the plurality of models are principal component analysis models. Each principal component analysis model may describe a corresponding operating state using a plurality of model parameters. The model parameters may include a mean and standard deviation of a set of training samples associated with the corresponding operating state and a control limit for the corresponding operating state.

In some embodiments, the FDD system includes a data scaler configured to use modeling parameters describing the plurality of stored operating states to scale the samples to each of the stored operating states. In some embodiments, the FDD system includes a sample indexer configured to generate indices for the scaled samples using the modeling parameters describing the stored operating state to which the samples are scaled.

In some embodiments, the FDD system includes a fault detector configured to compare the generated sample indices with a control limit for the stored operating state to which the samples are scaled. The fault detector may be configured to identify the samples as belonging to the stored operating state in response to the generated sample indices being within the control limit.

In some embodiments, the FDD system includes a sample reconstructor configured to reconstruct the samples along each of the directions from a stored operating state to each of the other stored operating states. In some embodiments, fault diagnoser is configured to compare a sample index for each reconstructed sample with a control limit for the stored operating state to which the sample is scaled. The fault diagnoser may be configured to identify the sample as belonging to the stored operating state corresponding to the direction along which the sample is reconstructed in response to the sample index being within the control limit.

Another implementation of the present disclosure is fault detection and diagnosis system (FDD). The FDD system includes a variable monitor configured to monitor a plurality of variables in a building management system and to generate a sample comprising values for each of the monitored variables. The FDD system includes a direction extractor configured to use locations, in a multidimensional modeling space, of a plurality of stored operating states to extract a direction from each of the stored operating states to each of the other stored operating states. The FDD system includes a fault diagnoser configured to identify the sample as belonging to a particular operating state using a voting-based diagnosis. In the voting-based diagnosis, each of the stored operating states votes for one or more other operating states based on the directions of the other operating states relative to a direction of the sample from a perspective of the stored operating state.

In some embodiments, the voting-based diagnosis includes iteratively selecting each of the stored operating states. The voting-based diagnosis may include recording, for each selected operating state, a vote for one or more of the other operating states for which the direction from the selected operating state to the other operating state is similar to the direction from the selected operating state to the sample. The voting-based diagnosis may include identifying the sample as belonging to the operating state with the most votes.

In some embodiments, the fault diagnoser is configured to record a vote for one or more of the other stored operating states in response to a determination that the directions of the one or more other stored operating states are similar to the direction of the sample. The fault diagnoser may be configured to record a vote for an unknown operating state in response to a determination that none of the directions of the other stored operating states are similar to the direction of the sample.

In some embodiments, the FDD system includes a modeler configured to generate a plurality of models describing the plurality of stored operating states. Each model may define the location of a stored operating state in the multi-dimensional modeling space. In some embodiments, the FDD system includes a data scaler configured to use modeling parameters describing the plurality of stored operating states to scale the sample to each of the stored operating states.

In some embodiments, the FDD system includes a sample indexer configured to generate a sample index for each scaled sample using the modeling parameters describing the stored operating state to which the sample is scaled. In some embodiments, the FDD system includes a fault detector configured to compare the generated sample index with a control limit for the stored operating state to which the sample is scaled. The fault detector may be configured to identify the sample as belonging to a stored operating state in response to the generated sample index being within the control limit for the stored operating state.

In some embodiments, the data scaler is configured to scale the sample to each of the plurality of stored operating states. In some embodiments, the fault detector is configured to determine whether each of the scaled samples belongs to the stored operating state to which the sample is scaled. In some embodiments, the fault diagnoser is configured to perform the voting-based fault diagnosis in response to the fault detector failing to identify the sample as belonging to any of the stored operating states.

In some embodiments, the FDD system includes a sample reconstructor configured to reconstruct each scaled sample along the directions from a stored operating state to each of the other stored operating states. In some embodiments, the FDD system includes a sample indexer configured to generate a sample index for each reconstructed sample using the modeling parameters describing the stored operating state to which the sample is scaled. In some embodiments, the fault diagnoser is configured to compare the sample index for each reconstructed sample with a control limit for the stored operating state to which the sample is scaled. The fault diagnoser may be configured to identify the sample as belonging to the stored operating state corresponding to the direction along which the sample is reconstructed in response to the sample index being within the control limit.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
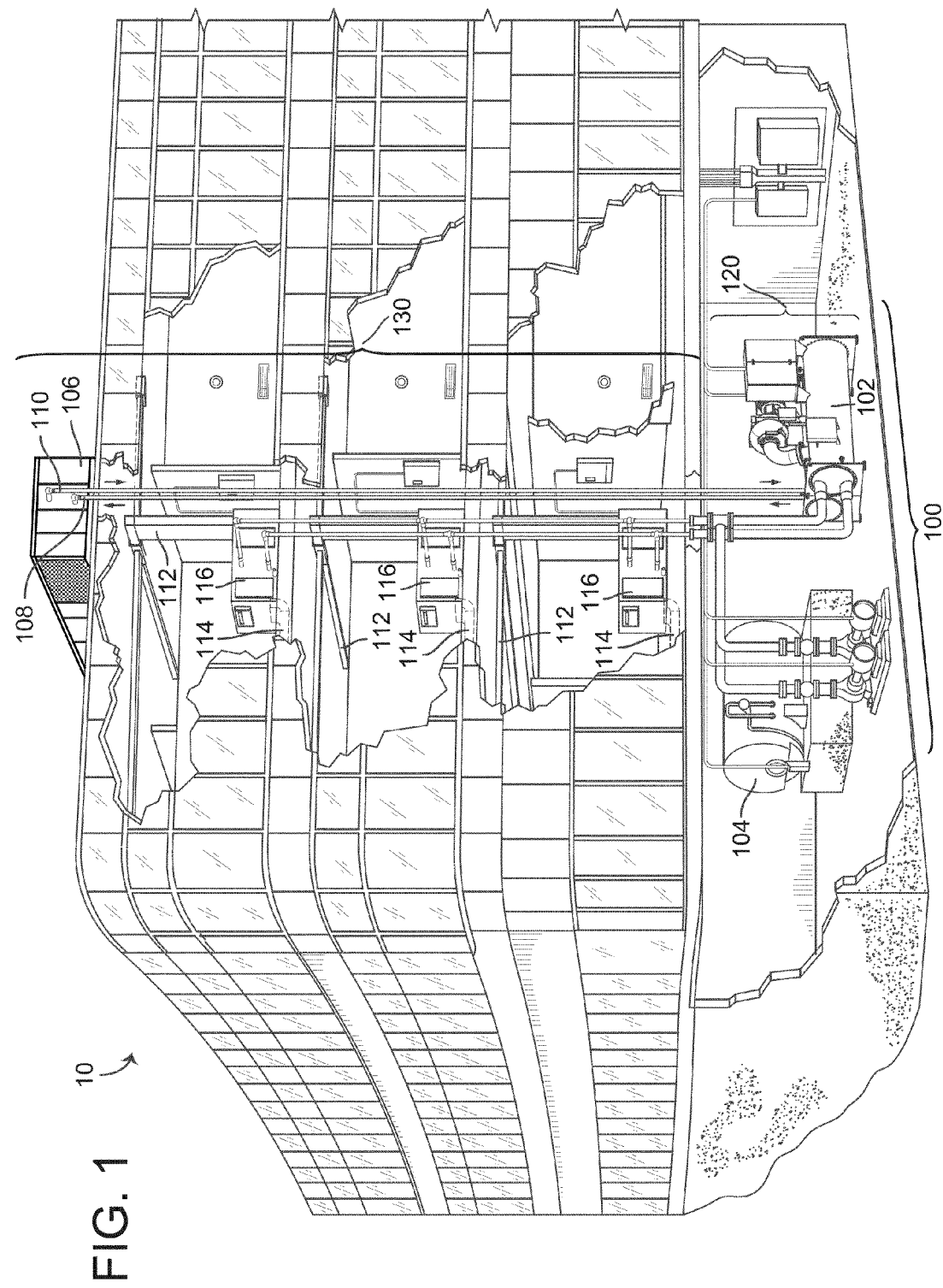
FIG. 1 is a drawing of a building equipped with a HVAC system, according to an exemplary embodiment.

Referring generally to the FIGURES, a building management system (BMS) and various components thereof are shown, according to an exemplary embodiment. The BMS includes sensors, building equipment, a building controller, and a fault detection and diagnostics (FDD) system. The sensors monitor variables in or around a building and the building equipment operate to affect one or more of the monitored variables. The building controller generates control signals for the building equipment based on the monitored variables. The FDD system uses principal component analysis (PCA) models to represent a plurality of distinct operating states for a system, device, or process controlled by the building controller. The FDD system may use the PCA models to determine a current operating state for the system, device, or process. The current operating state may be used by the building controller to generate the control signals.

In some embodiments, the FDD system uses monitored variables to create a plurality of PCA models. PCA is a multivariate statistical technique that takes into account correlations between two or more monitored variables. In some embodiments, the PCA models define the locations of the operating states within a multidimensional modeling space. Each of the PCA models may characterize the behavior of the monitored system, device, or process in a particular operating state. The FDD system may store the PCA models in a library of operating states (e.g., in memory or a database). The PCA models may not distinguish between normal states and faulty states, but rather treat each state equally for purposes of fault detection and diagnostics. For example, the FDD system may use the PCA models to determine which of a plurality of operating states is the current operating state. After the current operating state is identified, the FDD system may determine whether the identified operating state is normal or faulty (e.g., based on a description of the state).

The FDD system may use the library of operating states to determine whether new samples of the monitored variables correspond to any of the previously-stored operating states. For example, the FDD system may calculate a fault detection index $I(x)$ for a new sample of the monitored variables. The fault detection index $I(x)$ may be a function of both the current values of the monitored variables and one or more parameters of the PCA model for a given operating state (i.e., state k).

The FDD system may compare the fault detection index $I(x)$ to a control limit $\zeta^2$ for state k. If the fault detection index is within the control limit (e.g., $I(x) \leq \zeta^2$), the FDD system may identify state k as the current operating state. If the fault detection index is not within the control limit (e.g., $I(x) > \zeta^2$), the FDD system may recalculate the fault detection index $I(x)$ with respect to another of the stored operating states (i.e., state j) and compare the recalculated fault detection index to a control limit $\zeta^2$ for state j. The FDD system may repeat this process (e.g., iterating through each of the stored operating states j=1 . . . m) until the current operating state is identified.

In some embodiments, the FDD system uses a voting-based identification process to identify the current operating state. The FDD system may perform the voting-based identification process if the iterative process described above fails to identify any of the stored operating states as the current operating state. In some embodiments, the voting-based identification process includes calculating a direction from a given operating state (i.e., state k) to each of the other operating states (i.e., state j). The direction may be the orientation of a vector pointing from state k toward state j.

The FDD system may reconstruct the current sample of the monitored variables along each of the calculated directions (e.g., by subtracting a multiple of the vector from the current sample). If the reconstructed sample is within state k, the FDD system may record a vote for state j as the current operating state. A vote for state j as the current operating state indicates that the vector pointing from state k toward state j is generally in the same direction as a vector pointing from state k toward the current sample of the monitored variables. In other words, from the perspective of state k, both state j and the current sample of the monitored variables have the same general direction. The FDD system may repeat this process (e.g., iterating through each of the stored operating states k), recording a vote with each iteration. Once a vote has been recorded from the perspective of each operating state, the FDD system may select the operating state with the most votes as the current operating state. These and other features of the FDD system are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements.

AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
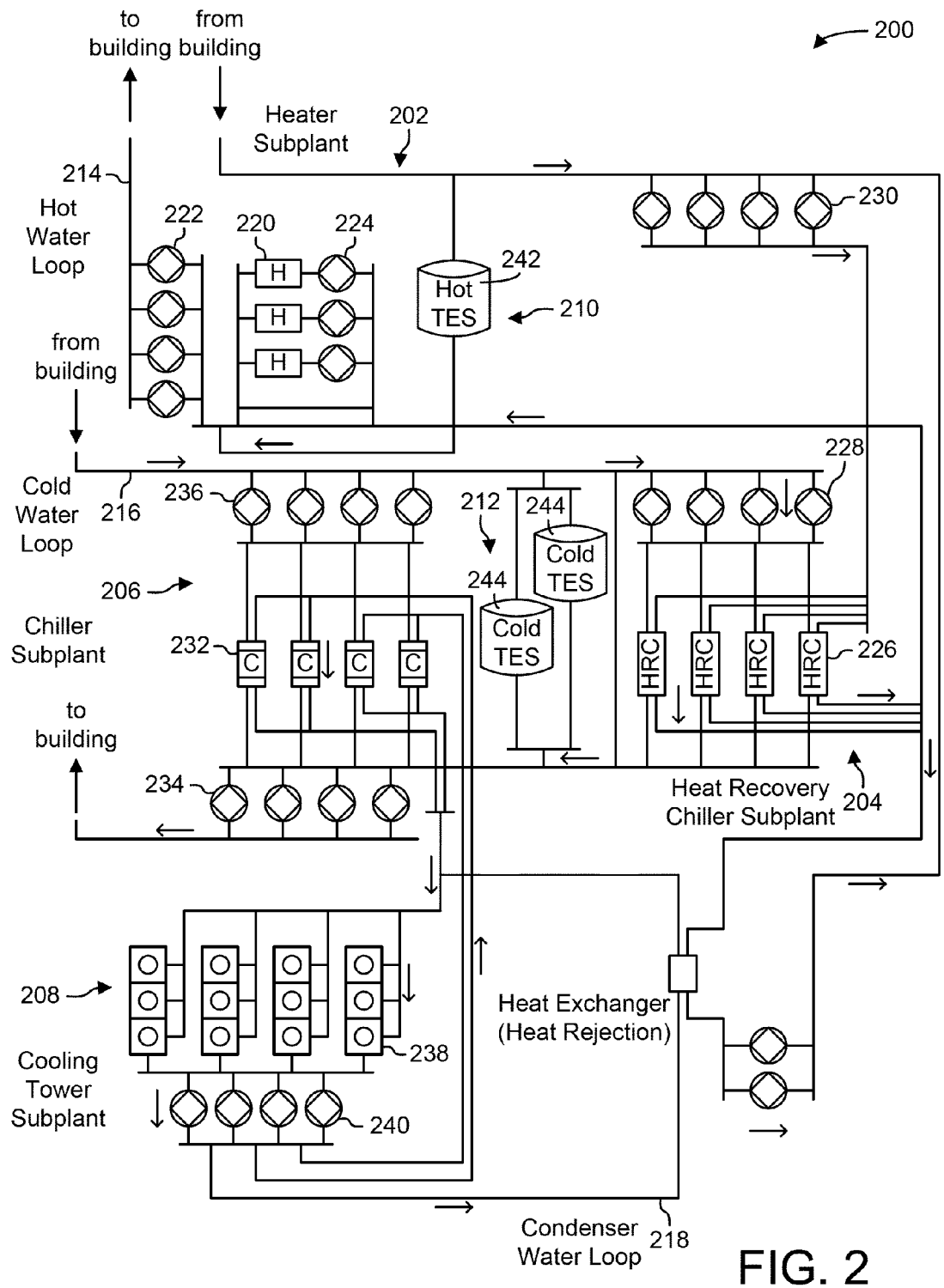
FIG. 2 is a schematic diagram of a waterside system which may be used in conjunction with the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
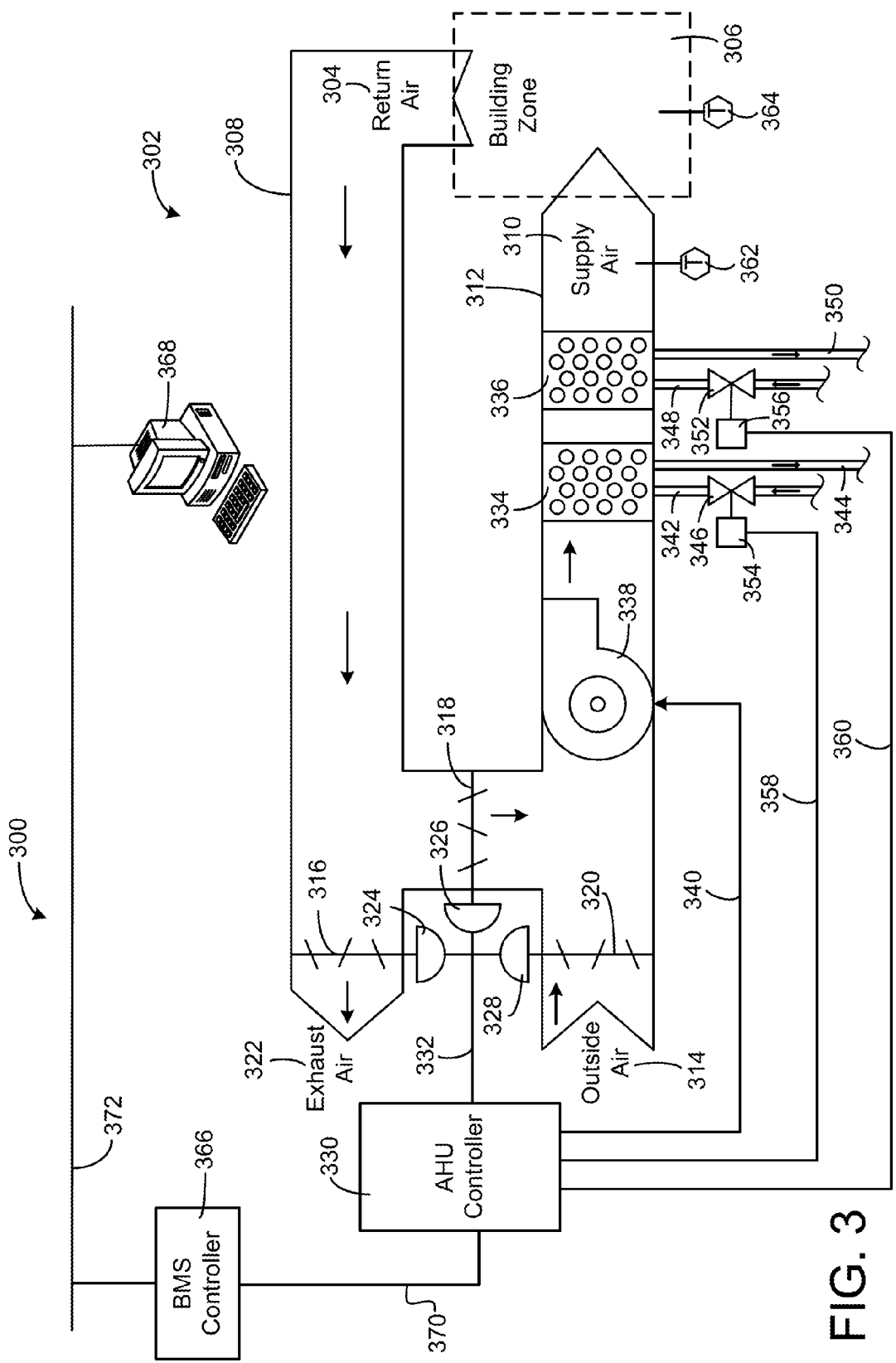
FIG. 3 is a schematic diagram of an airside system which may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
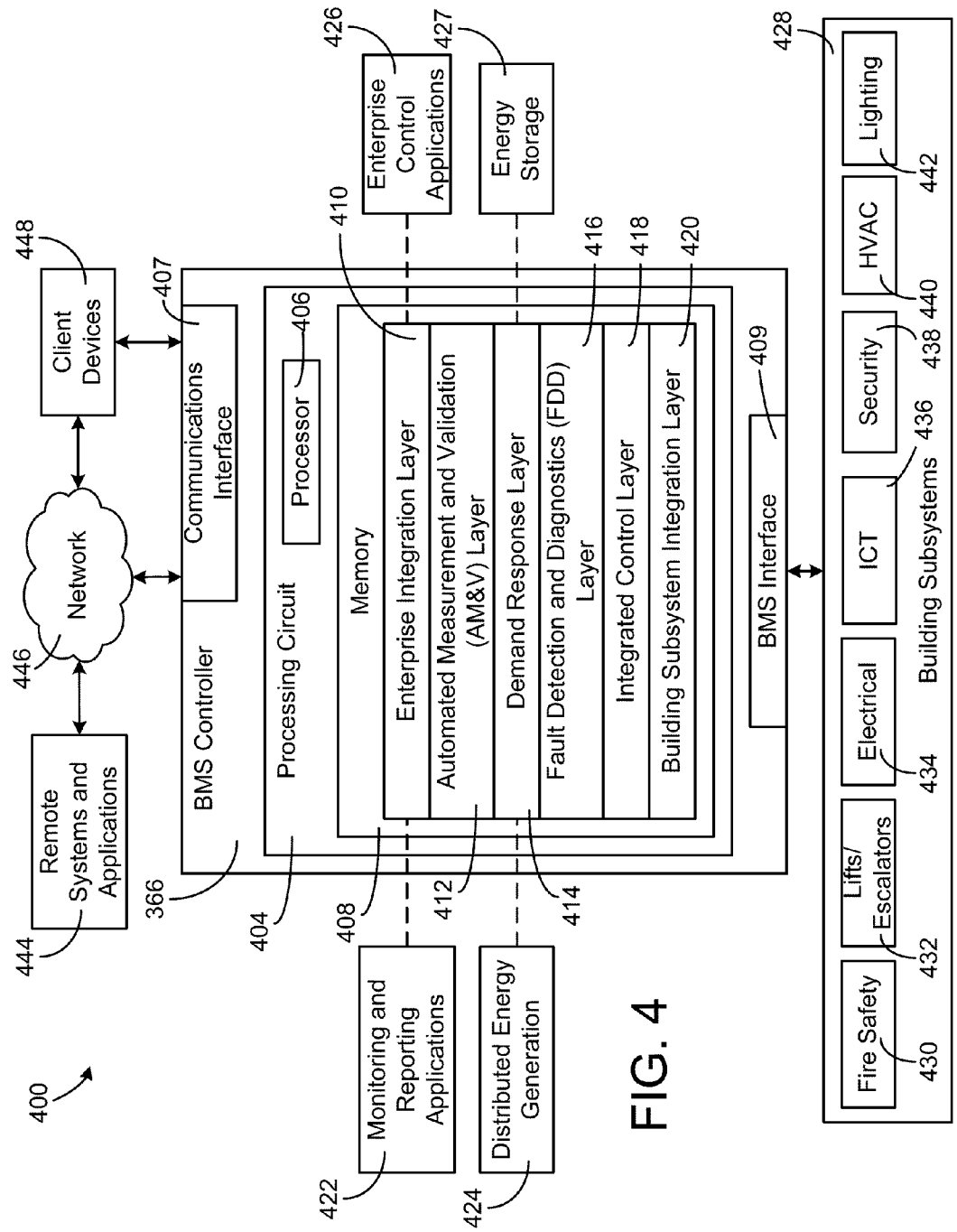
FIG. 4 is a block diagram of a building management system (BMS) which may be used to monitor and control the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fault Detection and Diagnostics

Figure 5:
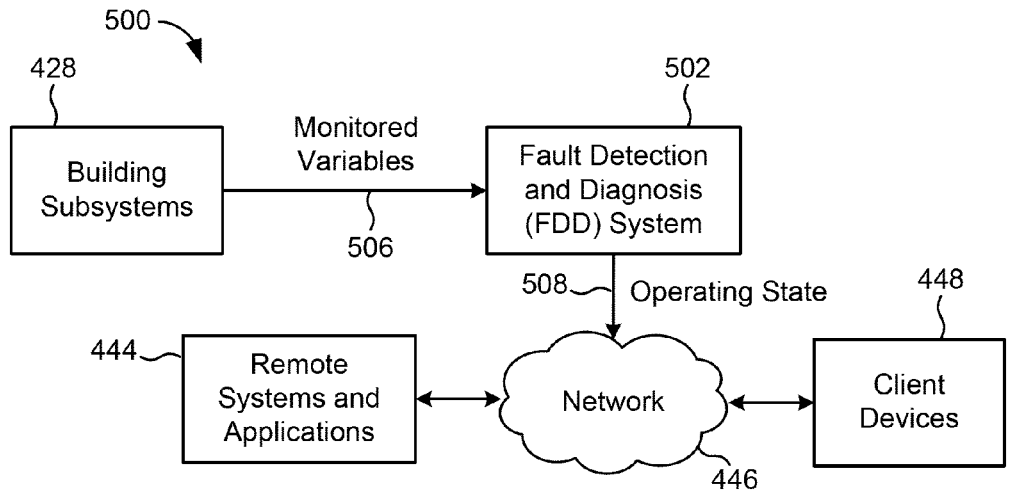
FIG. 5 is a block diagram of another BMS including a fault detection and diagnosis (FDD) system which may be used to detect and diagnose faults in the building of FIG. 1, according to an exemplary embodiment.

Referring now to FIG. 5, a block diagram of a building management system (BMS) 500 is shown, according to an exemplary embodiment. BMS 500 may include many of the same components as BMS 400, as described with reference to FIG. 4. For example, BMS 500 is shown to include building subsystems 428, network 446, client devices 448, and remote systems and applications 444. BMS 500 is also shown to include a fault detection and diagnosis (FDD) system 502. In some embodiments, FDD system 502 includes a controller. The controller may be the same or similar to BMS controller 366, as described with reference to FIGS. 3-4. In other embodiments, the controller is subsystem controller for one of building subsystems 428 (e.g., a HVAC controller, a lighting controller, etc.) or a local controller for one or more BMS devices (e.g., a chiller controller, a subplant controller, an AHU controller, etc.).

FDD system 502 may receive monitored variables 506 from building subsystems 428. In some embodiments, FDD system 502 is a component of BMS controller 366 (e.g., within FDD layer 416). For example, FDD system 502 may be implemented as part of a METASYS® brand building automation system, as sold by Johnson Controls Inc. In other embodiments, FDD system 502 may be a component of a remote computing system or cloud-based computing system configured to receive and process data from one or more building management systems. For example, FDD system 502 may be implemented as part of a PANOPTIX® brand building efficiency platform, as sold by Johnson Controls Inc. In other embodiments, FDD system 502 may be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables 506 from building subsystems 428.

Monitored variables 506 may include any measured or calculated values indicating the performance of building subsystems 428 and/or the components thereof. For example, monitored variables 506 may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables 506 may be received from building subsystems 428 and/or from various devices thereof. For example, monitored variables 506 may be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428.

FDD system 502 may use monitored variables 506 to identify a current operating state 508 for a monitored system, device, or process characterized by monitored variables 506. The current operating state 508 may be examined by FDD system 502 to expose when the monitored system, device, or process begins to degrade in performance. In some embodiments, FDD system 502 determines whether the current operating state 508 is a normal operating state or a faulty operating state. FDD system 502 may report the current operating state 508 to client devices 448, remote systems and applications 444, or any other system or device. Communications between FDD system 502 and other systems or devices may be direct or via an intermediate communications network, such as network 446. If the current operating state 508 is identified as a faulty state, FDD system 502 may generate an alert or notification for a user to repair the fault before it becomes more severe. In some embodiments, FDD system 502 uses the current operating state 508 to determine an appropriate control action for the monitored system, device, or process.

In some embodiments, FDD system 502 uses principal component analysis (PCA) models to identify the current operating state 508. PCA is a multivariate statistical technique that takes into account correlations between two or more monitored variables. FDD system 502 may use monitored variables 506 to create a plurality of PCA models. Each of the PCA models may characterize the behavior of the monitored system, device, or process in a particular operating state. FDD system 502 may store the PCA models in a library of operating states (e.g., in memory or a database).

FDD system 502 may use the library of operating states to determine whether new samples of the monitored variables 506 correspond to any of the previously-stored operating states. For example, FDD system 502 may calculate a fault detection index I(x) for a new sample of the monitored variables 506. The fault detection index I(x) may be a function of both the current values of the monitored variables 506 and one or more parameters of the PCA model for a given operating state (i.e., state k). FDD system 502 may compare the fault detection index I(x) to a control limit $\zeta^2$ for state k. If the fault detection index is within the control limit (e.g., $I(x) \leq \zeta^2$), FDD system 502 may identify state k as the current operating state 508. If the fault detection index is not within the control limit (e.g., $I(x) > \zeta^2$), FDD system 502 may recalculate the fault detection index I(x) with respect to another of the stored operating states (i.e., state j) and compare the recalculated fault detection index to a control limit $\zeta^2$ for state j. FDD system 502 may repeat this process (e.g., iterating through each of the stored operating states j=1 . . . m) until the current operating state 508 is identified.

In some embodiments, FDD system 502 uses a voting-based identification process to identify the current operating state 508. FDD system 502 may perform the voting-based identification process if the iterative process described above fails to identify any of the stored operating states as the current operating state 508. In some embodiments, the voting-based identification process includes calculating a direction between a given operating state (i.e., state k) and each of the other operating states (i.e., state j). The direction may be the orientation of a vector pointing from state k toward state j (described in greater detail with reference to FIG. 7).

FDD system 502 may reconstruct the current sample of the monitored variables 506 along each of the calculated directions (e.g., by subtracting a multiple of the vector from the current sample). If the reconstructed sample is within state k, FDD system 502 may record a vote for state j as the current operating state 508. A vote for state j as the current operating state indicates that the vector pointing from state k toward state j is generally in the same direction as a vector pointing from state k toward the current sample of the monitored variables 506. In other words, from the perspective of state k, both state j and the current sample of the monitored variables 506 have the same general direction. FDD system 502 may repeat this process (e.g., iterating through each of the stored operating states k), recording a vote with each iteration. Once a vote has been recorded from the perspective of each operating state, FDD system 502 may select the operating state with the most votes as the current operating state 508. In some embodiments, FDD system 502 uses the current operating state 508 to generate a control signal for building subsystems 428. These and other features of FDD system 502 are described in greater detail below.

Figure 6:
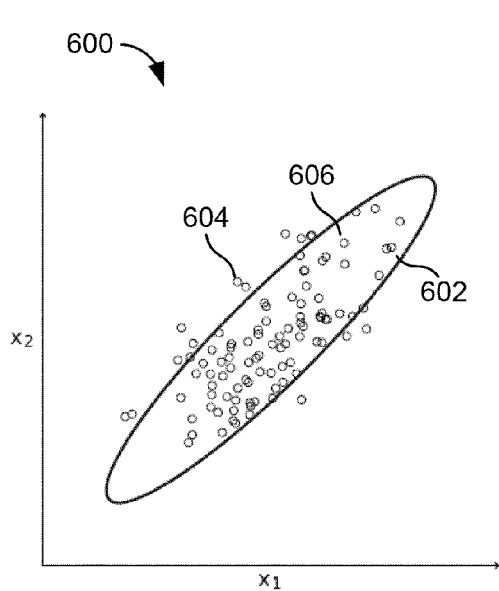
FIG. 6 is a graph of a principal component analysis (PCA) model which may be used to model an operating state of a system, device, or process controlled by the BMS of FIG. 5, according to an exemplary embodiment.

Referring now to FIG. 6, a graph 600 illustrating a PCA model 602 is shown, according to an exemplary embodiment. PCA model 602 may be constructed by FDD system 502 to facilitate the data-driven fault detection and diagnostics performed by FDD system 502. PCA model 602 captures a correlation between two or more of the monitored variables 506, shown in FIG. 6 as $x_1$ and $x_2$. In two-dimensional space, PCA model 602 can be conceptualized as an ellipse that spans the monitored variables $x_1$ and $x_2$.

Although only two of the monitored variables 506 are shown in FIG. 6, it should be understood that any number of monitored variables 506 may be modeled by PCA model 602. For example, if a third monitored variable is added, PCA model 602 can be conceptualized as an ellipsoid in three-dimensional space. In general, PCA model 602 may have any number of dimensions to accommodate any number of monitored variables 506. PCA model 602 may be represented as a multi-dimensional ellipsoid in multi-dimensional space. Each sample of the monitored variables 506 can be represented by a point in the multi-dimensional space. Points that lie within the ellipsoid (e.g., point 606) indicate normal samples, whereas points that lie outside the ellipsoid (e.g., point 604) indicate abnormal or faulty samples.

When a fault occurs, the faulty samples may lie outside PCA model 602 (e.g., outside the ellipsoid). FDD system 502 may characterize the fault by collecting a set of faulty samples and extracting the direction of the fault with respect to the PCA model 602 of the normal state. In some embodiments, FDD system 502 uses the faulty samples to build a PCA model of the faulty state. Advantageously, building a new PCA model allows FDD system 502 to identify a correlation structure for the faulty samples, which may be different from the correlation structure of the normal PCA model 602.

Figure 7:
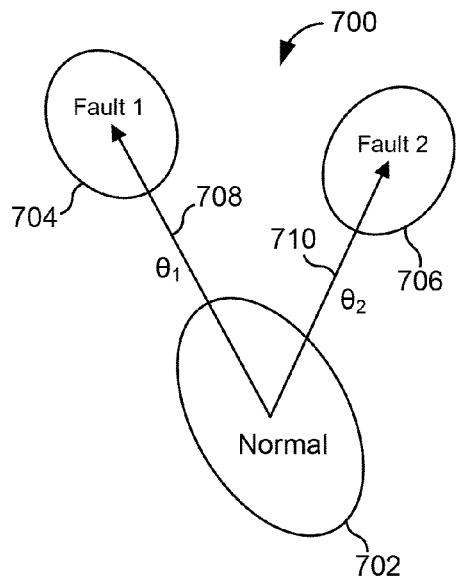
FIG. 7 is an illustration of a PCA model with a normal state and two faulty states with respect to the normal state, according to an exemplary embodiment.

Referring now to FIG. 7, another PCA model 700 is shown, according to an exemplary embodiment. PCA model 700 represents a monitored system, device, or process that has one normal state 702 and two faulty states 704-706. FDD system 502 may construct normal state 702 and faulty states 704-706 using samples of the monitored variables 506. When only one normal state 702 exists, each faulty state 704-706 can be characterized with respect to the single normal state 702. For example, vector 708 indicates the direction $\theta_1$ of faulty state 704 with respect to normal state 702, whereas vector 710 indicates the direction $\theta_2$ of faulty state 706 with respect to normal state 702. In some embodiments, $\theta_1$ and $\theta_2$ are n-dimensional vectors, where n is the number of monitored variables 506 characterized by each state. Throughout this disclosure, boldface variables are used to represent vectors and/or matrices.

Figure 8:
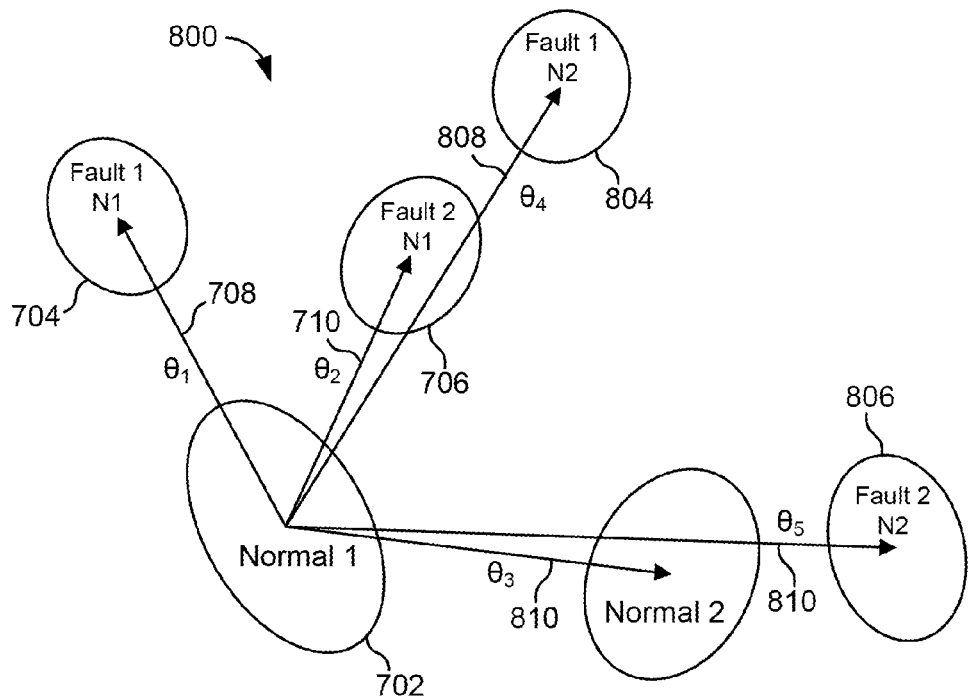
FIG. 8 is an illustration of a PCA model with multiple normal states and faulty states which describes all of the inactive states with respect to a single active state, according to an exemplary embodiment.

Referring now to FIG. 8, another PCA model 800 is shown, according to an exemplary embodiment. PCA model 800 represents a monitored system, device, or process that has two normal states 702 and 802. Each of normal states 702 and 802 has two corresponding faulty states. For example, normal state 702 has faulty states 704-706, whereas normal state 802 has faulty states 804-806. Faulty states 704-706 may be constructed by FDD system 502 based on faulty samples of the monitored variables 506 when the monitored system, device, or process was operating in normal state 702. Similarly, faulty states 804-806 may be constructed by FDD system 502 based on faulty samples of the monitored variables 506 when the monitored system, device, or process was operating in normal state 802.

FDD system 502 may be configured to characterize any of the normal or faulty operating states with respect to any of the other normal or faulty operating states. For example, vector 708 indicates the direction $\theta_1$ of faulty state 704 with respect to normal state 702. Vector 710 indicates the direction $\theta_2$ of faulty state 706 with respect to normal state 702. Vector 808 indicates the direction $\theta_4$ of faulty state 804 with respect to normal state 702. Vector 810 indicates the direction $\theta_5$ of faulty state 806 with respect to normal state 702. Vector 812 indicates the direction $\theta_3$ of normal state 802 with respect to normal state 702. Any of the normal or faulty states can be characterized in a similar manner with respect to normal state 802 or any of the faulty states 704-706 and 804-806.

In some embodiments, FDD system 502 characterizes new values of the monitored variables 506 with respect to the most recent normal operating state. For example, if normal state 702 is the current operating state, new values of the monitored variables 506 may be characterized with respect to normal state 702. When the monitored system, device, or process transitions from normal state 702 to normal state 802, FDD system 502 may flag normal state 802 as a faulty state with respect to normal state 702 because the new values of the monitored variables 506 are not within state 702. It may be difficult for FDD system 502 to distinguish between normal state 802 and faulty state 806 from the perspective of normal state 702 since the directions $\theta_3$ and $\theta_5$ are similar. The same is true for distinguishing between faulty state 706 and faulty state 804 since the directions $\theta_2$ and $\theta_4$ are similar.

Figure 9:
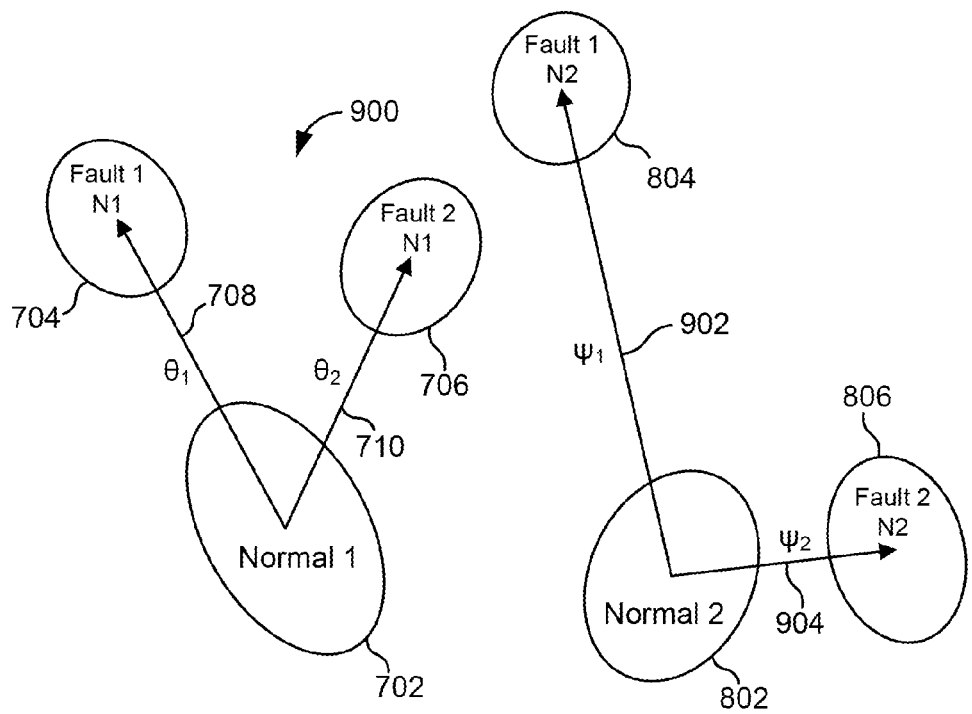
FIG. 9 is an illustration of a PCA model with multiple normal states and faulty states which describes each group of faulty states with respect to the normal state that was active when the faulty behavior occurred, according to an exemplary embodiment.

Referring now to FIG. 9, another PCA model 900 is shown, according to an exemplary embodiment. FDD system 502 may generate PCA model 900 by characterizing each faulty state with respect to a particular normal state. For example, when the monitored system, device, or process is operating in normal state 702, FDD system 502 may use faulty values of the monitored variables 506 to characterize faulty states 704 and 706 with respect to normal state 702. Vector 708 indicates the direction $\theta_1$ of faulty state 704 with respect to normal state 702. Vector 710 indicates the direction $\theta_2$ of faulty state 706 with respect to normal state 702. Similarly, when the monitored system, device, or process is operating in normal state 802, FDD system 502 may use faulty values of the monitored variables 506 to characterize faulty states 804 and 806 with respect to normal state 802. Vector 902 indicates the direction $\psi_1$ of faulty state 804 with respect to normal state 802. Vector 904 indicates the direction $\psi_2$ of faulty state 806 with respect to normal state 802.

When the normal state changes, FDD system 502 may switch to the PCA model representing the new normal state (i.e., normal state 702 or 802) and identify faults with respect to the new normal state. Advantageously, this allows FDD system 502 to more easily distinguish between various faulty states since the direction $\theta_1$ is clearly distinguishable from the direction $\theta_2$, and the direction $\psi_1$ is clearly distinguishable from the direction $\psi_2$. However, if faulty states 704-706 occur while operating in normal state 802, the fault may not be identified since PCA model 900 does not include information identifying either of faulty states 704-706 from the perspective of normal state 802 (i.e., vectors and/or directions from normal state 802 to faulty states 704-706). The same is true for identifying faulty states 804-806 from the perspective of normal state 702.

Figure 10A:
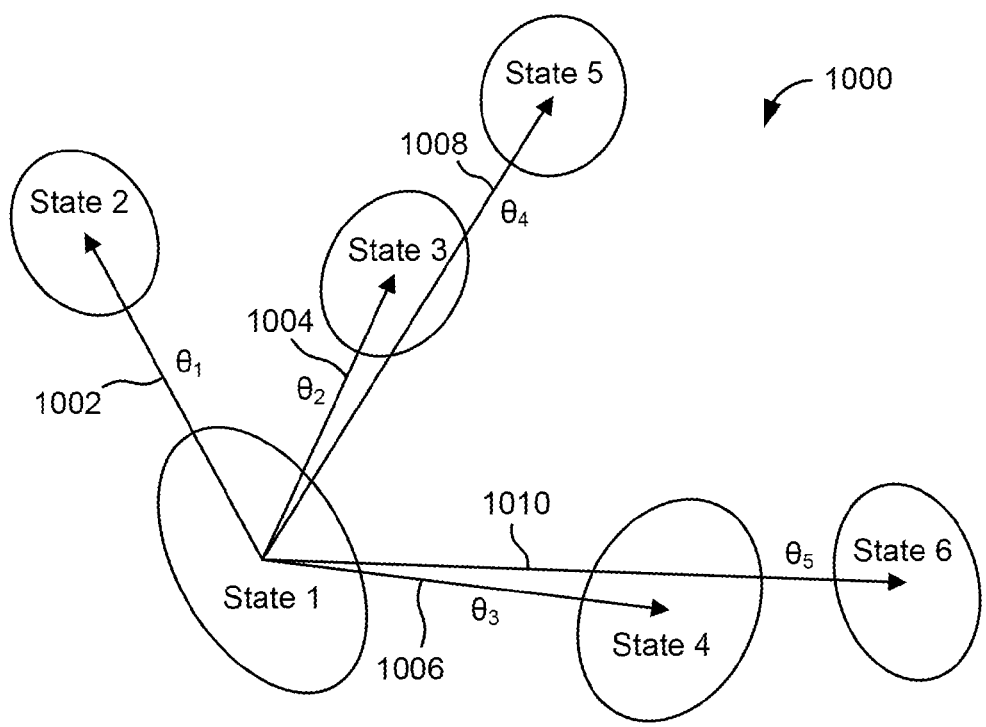
FIGS. 10A-10B are illustrations of a PCA model does not characterize the operating states as normal or faulty and which is capable of describing any state with respect to any of the other states, according to an exemplary embodiment.
Figure 10B:
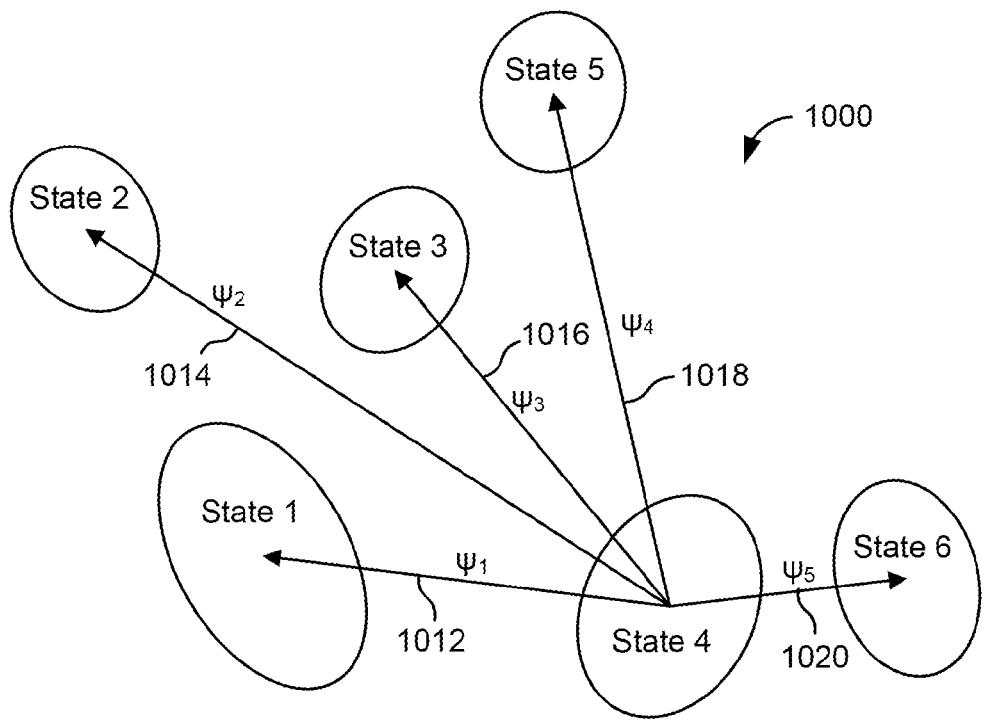

Referring now to FIGS. 10A-10B, another PCA model 1000 is shown, according to an exemplary embodiment. PCA model 1000 represents a monitored system, device, or process that has five operating states (i.e., states 1-5). PCA model 1000 does not distinguish between normal states and faulty states, but rather treats each state equally for purposes of fault detection and diagnosis. For example, FDD system 502 may use PCA model 1000 to determine which of states 1-5 is the current operating state. After the current operating state is identified, FDD system 502 may determine whether the identified operating state is normal or faulty (e.g., based on a description of the conditions under which the state was created).

Advantageously, PCA model 1000 characterizes each of states 1-5 with respect to whichever state is the current operating state. For example, FIG. 10A shows state 1 as the current operating state with vectors 1002-1010 pointing from state 1 to the other states 2-4. Vector 1002 indicates the direction $\theta_1$ from state 1 to state 2. Vector 1004 indicates the direction $\theta_2$ from state 1 to state 3. Vector 1006 indicates the direction $\theta_3$ from state 1 to state 4. Vector 1008 indicates the direction $\theta_4$ from state 1 to state 5. Vector 1010 indicates the direction $\theta_5$ from state 1 to state 6. FDD system 502 may use a history of values for the monitored variables 506 to calculate each of vectors 1002-1010 and directions $\theta_1$-$\theta_5$.

When the current operating state changes, FDD system 502 may recalculate the vectors and directions with respect to the new operating state. For example, FIG. 10B shows state 4 as the current operating state with vectors 1012-1020 pointing from state 4 to the other states 1-3 and 5. Vector 1012 indicates the direction $\psi_4$ from state 4 to state 1. Vector 1014 indicates the direction $\psi_2$ from state 4 to state 2. Vector 1016 indicates the direction $\psi_3$ from state 4 to state 3. Vector 1018 indicates the direction $\psi_4$ from state 4 to state 5. Vector 1020 indicates the direction $\psi_5$ from state 4 to state 6. FDD system 502 may use a history of values for the monitored variables 506 to calculate each of vAectors 1012-1020 and directions $\psi_1$-$\psi_5$.

FDD system 502 may recalculate the vectors and directions in PCA model 1000 with respect to whichever state is the current operating state, regardless of whether the state is normal or faulty. For example, if state 1 is the current operating state and a known fault occurs, FDD system 502 may transition into the operating state corresponding to the known fault (e.g., state 2, state 3, etc.). FDD system 502 may use the PCA model for the faulty state to monitor the system or process while the problem is fixed. For example, if the faulty state is state 2, FDD system 502 may recalculate the vectors and directions with respect to state 2. FDD system 502 may then perform regular fault detection and diagnostics using the PCA model for state 2. When the problem is fixed and the monitored system or process returns to state 1, FDD system 502 may detect the change as a deviation from state 2. FDD system 502 may then identify state 1 as the current operating state and recalculate the vectors and directions with respect to state 1. If state 1 is a faulty state, FDD system 502 may trigger an alarm or notification. Otherwise, FDD system 502 may continue with normal FDD operations without triggering an alarm or notification.

In some embodiments, FDD system 502 uses PCA model 1000 to identify and model known transition states that are not representative of normal operation, but do not represent a fault that needs to be addressed or repaired. For example, chillers may have a startup period during which the chiller is approaching steady-state operation. This is a transition state which is not representative of normal chiller operation, but should not be considered a fault for purposes of fault detection and diagnostics. FDD system 502 may use samples of the monitored variables 506 during the startup period to develop a PCA model for a startup state. When the startup state is subsequently identified, FDD system 502 may determine that the chiller is operating in a known transition state rather than a faulty state indicative of a problem with the chiller.

In some embodiments, FDD system 502 uses PCA model 1000 to calculate fault detection indices and state directions with respect to multiple different operating states. Advantageously, this flexibility allows FDD system 502 to perform fault diagnosis using any state model. For example, FDD system 502 may perform multiple independent diagnoses of which operating state is the current operating state 508. Each diagnosis may use the PCA model for a particular operating state to calculate a direction to the current operating state 508 from the perspective of the particular operating state. FDD system 502 may use the diagnosis given by one state model to confirm the diagnosis given by another state model. In some embodiments, the diagnosis provided by each state model represents a vote for the current operating state. FDD system 502 may perform multiple independent diagnoses using a variety of different state models to cast votes for the current operating state 508. FDD system 502 may then select the operating state with the most votes as the current operating state 508.

Fault Detection and Diagnosis System

Figure 11:
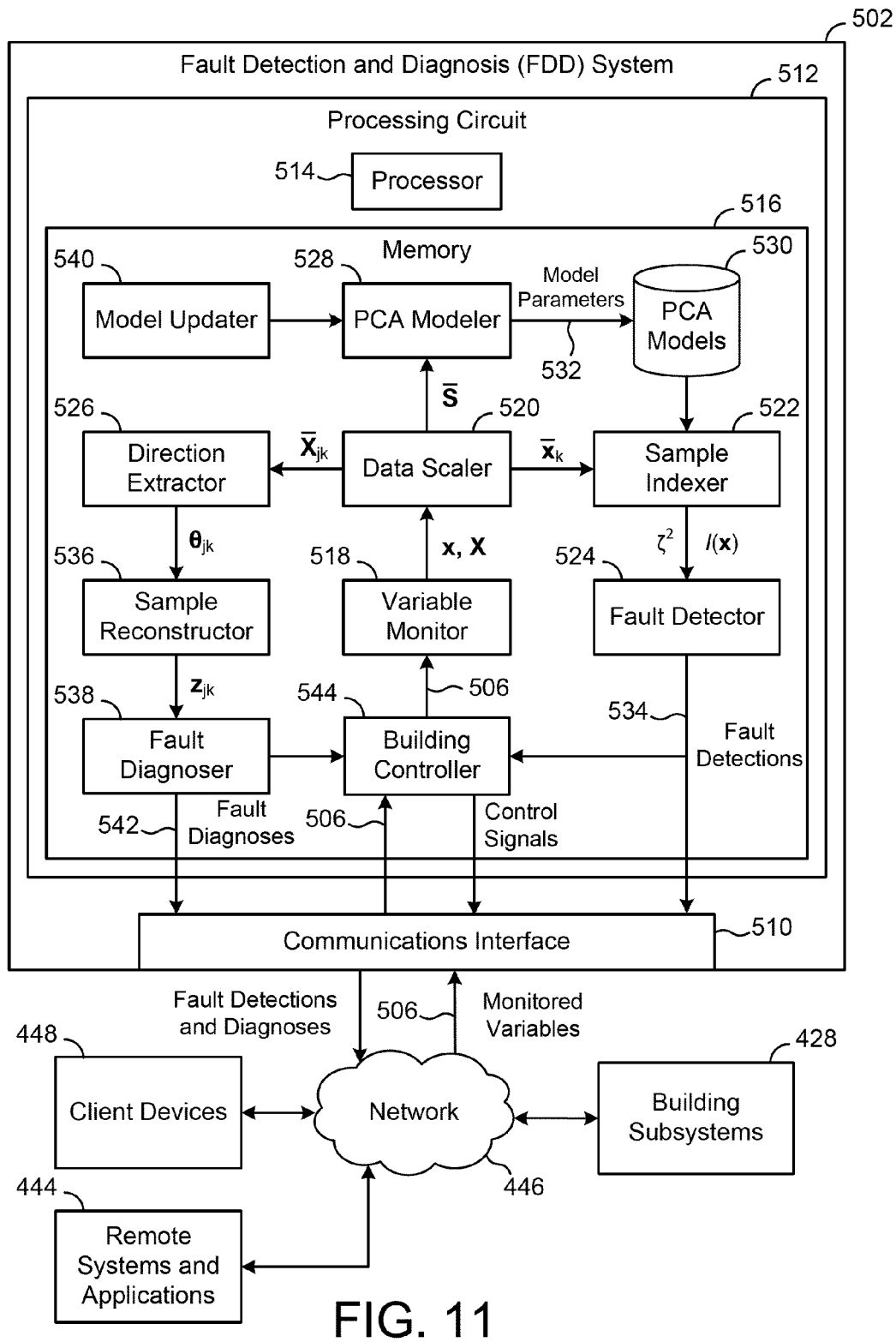
FIG. 11 is a block diagram illustrating the FDD system of FIG. 5 in greater detail, according to an exemplary embodiment.

Referring now to FIG. 11, a block diagram illustrating FDD system 502 in greater detail is shown, according to an exemplary embodiment. FDD system 502 is shown to include a communications interface 510 and a processing circuit 512. Communications interface 510 may facilitate communications between FDD system 502 and various external systems or devices. For example, FDD system 502 may receive monitored variables 506 from building subsystems 428 and provide control signals to building subsystems 428 via communications interface 510. Communications interface 510 may also be used to communicate with remote systems and applications 444, client devices 448, and/or any other external system or device. For example, FDD system 502 may provide fault detections and diagnoses to remote systems and applications 444, client devices 448, or any other external system or device via communications interface 510.

Communications interface 510 may include any number and/or type of wired or wireless communications interfaces (e.g., jacks, antennas, transmitters, receivers, transceivers, wire terminals, etc.). For example, communications interface 510 can include an Ethernet card and port for sending and receiving data via an Ethernet-based communications link or network. As another example, communications interface 510 can include a WiFi transceiver, a NFC transceiver, a cellular transceiver, a mobile phone transceiver, or the like for communicating via a wireless communications network. In some embodiments, communications interface 510 includes RS232 and/or RS485 circuitry for communicating with BMS devices (e.g., chillers, controllers, etc.). Communications interface 510 may be configured to use any of a variety of communications protocols (e.g., BACNet, Modbus, N2, MSTP, Zigbee, etc.). Communications via interface 510 may be direct (e.g., local wired or wireless communications) or via an intermediate communications network 446 (e.g., a WAN, the Internet, a cellular network, etc.). Communications interface 510 may be communicably connected with processing circuit 512 such that processing circuit 512 and the various components thereof can send and receive data via communications interface 510.

Processing circuit 512 is shown to include a processor 514 and memory 516. Processor 514 can be implemented as a general purpose processor, an application specific integrated circuit (ASIC), one or more field programmable gate arrays (FPGAs), a group of processing components, or other suitable electronic processing components. Memory 516 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 516 may be or include volatile memory or non-volatile memory. Memory 516 may include database components, object code components, script components, or any other type of information structure for supporting the various activities and information structures described in the present application. According to an exemplary embodiment, memory 516 is communicably connected to processor 514 via processing circuit 512 and includes computer code for executing (e.g., by processing circuit 512 and/or processor 514) one or more processes described herein.

Still referring to FIG. 11, memory 516 is shown to include a variable monitor 518. Variable monitor 518 may be configured to monitor one or more variables (i.e., monitored variables 506) that indicate the performance of a monitored system, device, or process. For example, monitored variables 506 may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables 506 may be received from building subsystems 428 and/or from various devices thereof. For example, monitored variables 506 may be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428.

In some embodiments, monitored variables 506 include n different time-series variables. Variable monitor 518 may gather measurements or other values (e.g., calculated or estimated values) of the n time-series variables in a sample vector x, where $x \in \Re^n$. Variable monitor 518 may be configured to collect m samples of each of the n time-series variables. Variable monitor 518 may generate a sample matrix X, where $X \in \Re^{m \times n}$. The sample matrix X may include m samples of each of the n time-series variables, as shown in the following equation:

$$X = [x_1 \ x_2 \ \ldots \ x_m]^T$$

where each of the m sample vectors x (e.g., $x_1$, $x_2$, etc.) includes a value for each of the n time-series variables.

In some embodiments, variable monitor 518 groups sample vectors x based on an operating state during which the sample vectors x were collected. For example, variable monitor 518 may group the sample vectors x collected during a first operating state (e.g., state 1) into a first sample matrix $X_1$, and group the sample vectors x collected during a second operating state (e.g., state 2) into a second sample matrix $X_2$. Each of the sample matrices X may include values of the monitored variables 506 that represent a particular operating state. During a training period, the operating states associated with each of the sample vectors x may be specified by a user or indicated by another data source. Each of the sample matrices X may be used by FDD system 502 to generate a PCA model for a different operating state. Once the PCA models are generated, new sample vectors x (or samples) can be collected and automatically identified by FDD system 502 as belonging to a particular operating state using the PCA models.

Still referring to FIG. 11, memory 516 is shown to include a data scaler 520. Data scaler 520 is shown receiving the sample vectors x and the sample matrices X from variable monitor 518. Data scaler 520 may be configured to calculate the mean and standard deviation of the sample vectors x for each of the operating states. For example, data scaler 520 may calculate the mean b of a set of sample vectors x using the following equation:

$$b = \frac{1}{m}\sum_{i=1}^{m} x_i = \frac{1}{m} X^T 1_m$$

where $x_i$ represents the ith sample vector x for a particular operating state, $1_m$ is a vector of size m whose elements are all 1 (i.e., $1_m=[1\ 1\ \ldots\ 1]$), and $X^T$ is sample matrix that includes a set of m sample vectors x representing the same operating state.

Data scaler 520 may calculate the standard deviation of the sample vectors x for a particular operating state from the covariance matrix S of the sample matrix X for the operating state. For example, data scaler 520 may calculate the covariance matrix S using the following equation:

$$S = \frac{1}{m}\sum_{i=1}^{m} (x_i - b)(x_i - b)^T$$

$$S = \frac{1}{m}(X - 1_m b^T)(X - 1_m b^T)^T$$

$$S = \frac{1}{m}(X^T X - mbb^T)$$

Data scaler 520 may then calculate the standard deviation V by taking the square root of the diagonal matrix that contains the diagonal elements of the covariance matrix S, as shown in the following equation:

$$V = \sqrt{\mathrm{diag}(S)}$$

Data scaler 520 may repeat these calculations for each of the operating states (e.g., using the sample vectors x and/or the sample matrix X for a particular operating state) to determine the mean b and standard deviation V for each of the operating states.

In some embodiments, data scaler 520 uses the mean b and standard deviation V for a particular operating state (i.e., state k) to scale new samples of the monitored variables 506 with respect to that operating state. For example, data scaler 520 may scale a new sample vector x with respect to operating state k using the following equation:

$$\bar{x}_k = V_k^{-1}(x - b_k)$$

where $V_k$ is the standard deviation for state k, $b_k$ is the mean for state k, and the vector $\bar{x}_k$ is the sample vector x scaled with respect to state k. In some embodiments, data scaler 520 scales each new sample with respect to each of the operating states. For example, data scaler 520 may iteratively scale a new sample vector x with respect each operating state k, where $k \in \Re^N$ and N is the total number of operating states. Data scaler 520 may provide the scaled sample vector(s) $\bar{x}_k$ to sample indexer 522 and fault detector 524 for use in determining whether the new sample qualifies as a fault with respect to state k (described in greater detail below).

In some embodiments, data scaler 520 uses the mean b and standard deviation V for a particular operating state (i.e., state k) to scale the sample matrix X for the same operating state. For example, data scaler 520 may scale the sample matrix $X_k$ using the following equation:

$$\bar{X} = (X_k - 1_m b_k^T) V_k^{-1}$$

where $V_k$ is the standard deviation for state k, $b_k$ is the mean for state k, and the matrix $\bar{X}$ is the scaled sample matrix X for state k. In some embodiments, data scaler 520 determines the scaled sample matrix $\bar{X}$ for each of the operating states. For example, data scaler 520 may iteratively calculate the scaled sample matrix $\bar{X}$ for each operating state k, where $k \in \Re^N$ and N is the total number of operating states.

In some embodiments, data scaler 520 uses the mean b and standard deviation V for a particular operating state (i.e., state k) to scale a sample matrix $X_j$ for a different operating state. The sample matrix $X_j$ may consist of m samples of the n monitored variables (i.e., $X_j \in \Re^{m \times n}$). In some embodiments, the sample matrix $X_j$ represents another of the operating states (i.e., state j). In other embodiments, the sample matrix $X_j$ represents a set of samples that have not yet been identified as belonging to any particular operating state. Data scaler 520 may scale the sample matrix $X_j$ with respect to operating state k using the following equation:

$$\bar{X}_{jk} = (X_j - 1_m b_k^T) V_k^{-1}$$

where $V_k$ is the standard deviation for state k, $b_k$ is the mean for state k, and the matrix $\bar{X}_{jk}$ is the sample matrix $X_j$ scaled with respect to operating state k. In some embodiments, data scaler 520 scales each sample matrix X with respect to each of the operating states. For example, data scaler 520 may iteratively scale sample matrix $X_j$ from each operating state $j \in \Re^N$ with respect to each of the other operating states $k \in \Re^{N-1}$, where N is the total number of operating states. Data scaler 520 may provide the scaled sample matrices $\bar{X}_{jk}$ to direction extractor 526 for use in determining the direction $\theta_{jk}$ of state j from the perspective of state k (described in greater detail below).

In some embodiments, data scaler 520 uses the mean b and/or standard deviation V for a particular operating state (i.e., state k) to scale the covariance matrix S for the same operating state. For example, data scaler 520 may scale the covariance matrix $S_k$ using the following equation:

$$\bar{S} = \frac{1}{m}\bar{X}^T \bar{X}$$

$$\bar{S} = \frac{1}{m} V_k^{-1}(X^T X - mb_k b_k^T) V_k^{-1}$$

$$\bar{S} = V_k^{-1} S_k V_k^{-1}$$

where $V_k$ is the standard deviation for state k, $b_k$ is the mean for state k, and the matrix $\bar{S}$ is the scaled covariance matrix S for state k. In some embodiments, data scaler 520 determines the scaled covariance matrix $\bar{S}$ for each of the operating states. For example, data scaler 520 may iteratively calculate the scaled covariance matrix $\bar{S}$ for each operating state k, where $k \in \Re^N$ and N is the total number of operating states. Data scaler 520 may provide the scaled covariance matrices $\bar{S}$ to PCA modeler 528 for use in generating a PCA model 530 for each operating state.

Still referring to FIG. 11, memory 516 is shown to include a principal component analysis (PCA) modeler 528. PCA modeler 528 may be configured to generate model parameters 532 for the PCA models 530 used by FDD system 502 to perform the fault detection and diagnostic processes described herein. In some embodiments, PCA modeler 528 generates model parameters 532 by performing singular value decomposition (SVD) on the scaled covariance matrices $\bar{S}$ generated by data scaler 520. SVD is a statistical technique in which a factorization of the form $\bar{S}=UDU^T$ is obtained from a real or complex matrix (i.e., the scaled covariance matrix $\bar{S}$). PCA modeler 528 may factor each of the scaled covariance matrices g as shown in the following equation:

$$\bar{S} = UDU^T$$

$$\bar{S} = [P \ \tilde{P}] \begin{bmatrix} \Lambda & 0 \\ 0 & \tilde{\Lambda} \end{bmatrix} [P \ \tilde{P}]^T$$

$$\bar{S} = P\Lambda P^T + \tilde{P}\tilde{\Lambda}\tilde{P}^T$$

where the matrix P represents the loadings of the PCA model and consists of the first l singular vectors in U that correspond to the largest l singular values in D. These singular values are represented in $\Lambda$. The residuals of the singular values are stored in $\tilde{\Lambda}$ and the residuals of the vectors are stored in $\tilde{P}$. In some embodiments, the singular values $\Lambda$ and $\tilde{\Lambda}$ and the vectors P and $\tilde{P}$ are the model parameters 532.

In some embodiments, the SVD process performed by PCA modeler 528 uses only the scaled covariance matrix $\bar{S}$ for a given state to generate the model parameters 532 for the corresponding PCA model 530. Advantageously, this feature allows PCA modeler 528 to generate model parameters 532 for PCA models 530 without requiring the sample data (i.e., the sample vectors x and/or the sample matrices X) to be stored or maintained in memory once the scaled covariance matrices $\bar{S}$ are generated. The PCA models 530 generated by PCA modeler 528 can be used to reconstruct the original scaled covariance matrices $\bar{S}$. If the means b and standard deviations V of the sample data are known, the original covariance matrices S can also be reconstructed. The reconstruction of these matrices may be used by various components of FDD system 502 for fault detection and diagnostics.

PCA modeler 528 may be configured to generate and store a PCA model 530 for each of a plurality of operating states. The stored PCA models 530 define a library of operating states that can be identified for new samples of the monitored variables 506. For example, when a new sample x of the monitored variables 506 is obtained, the sample x may be scaled by data scaler 520 and indexed by sample indexer 522 with respect to one or more of the stored operating states (e.g., using the PCA model parameters 532 for the operating state). Fault detector 524 may determine whether the sample is associated with a particular operating state by comparing the sample index I(x) with control limits $\zeta^2$ for the operating state. If the sample index I(x) is not within the control limits $\zeta^2$ for any of the stored operating states, fault diagnoser 538 may perform a voting-based fault diagnosis to determine which of the operating states is the current operating state. The indexing, fault detection, and diagnostic processes are described in greater detail below.

Still referring to FIG. 11, memory 516 is shown to include a sample indexer 522. Sample indexer 522 may be configured to generate fault detection indices for samples x of the monitored variables 506. Sample indexer 522 is shown receiving the scaled sample vectors from data scaler 520. In some embodiments, sample indexer 522 uses the scaled sample vectors to generate fault detection indices. For example, sample indexer 522 may generate fault detection indices using the following equation:

$$I(x) = x^T M x$$

where I(x) is the fault detection index, x is the scaled sample vector x generated by data scaler 520, and M is a matrix of the detection index for a particular operating state.

In some embodiments, the matrix M is a function of the model parameters 532 for a given PCA model 530 (i.e., for a particular operating state). For example, sample indexer 522 may calculate the matrix M using the following equation:

$$M = \frac{P\Lambda^{-1}P^T}{\tau^2} + \frac{\tilde{P}\tilde{P}^T}{\delta^2}$$

where P, $\Lambda$, and $\tilde{P}$ are model parameters 532 generated by PCA modeler 528 for the operating state. The parameters $\tau^2$ and $\delta^2$ may be control limits of the Hotelling's $T^2$ statistic and the squared prediction error (SPE), respectively. Sample indexer 522 may calculate $\tau^2$ using the following equation:

$$\tau^2 = \chi_\alpha^2(l)$$

where the term $\chi_\alpha^2(l)$ represents the inverse value of a chi square distribution with l degrees of freedom and a confidence level of $(1-\alpha) \times 100\%$. Sample indexer 522 may calculate the control limit $\delta^2$ using the following equation:

$$\delta^2 = g_s \chi_\alpha^2(h_s)$$

where $$g_s = \frac{\omega_2}{\omega_1}, \ h_s = \frac{\omega_1^2}{\omega_2},$$

$\omega_1 = \sum_{i=l+1}^{n} \lambda_i$, and $\omega_2 = \sum_{i=l+1}^{n} \lambda_i^2$. The parameter $\lambda_i$ may be the ith singular value of the scaled covariance matrix S for the operating state. In some embodiments, sample indexer 522 calculates the matrix of the detection index $M_k$ and the corresponding fault detection index $I(x)_k$ for each operating state $k \in \Re^N$.

Sample indexer 522 may generate control limits $\zeta^2$ for the fault detection indices I(x). In some embodiments, the control limit $\zeta^2$ is a function of the model parameters 532 for a given PCA model 530 (i.e., for a particular operating state). For example, sample indexer 522 may calculate the control limit $\zeta^2$ using the following equation:

$$\zeta^2 = g_z \chi_\alpha^2(h_z)$$

where $g_z$ and $h_z$ are defined as follows:

$$g_z = \frac{\text{tr}\{\bar{S}M\}^2}{\text{tr}\{\bar{S}M\}}, \ h_z = \frac{[\text{tr}\{\bar{S}M\}]^2}{\text{tr}\{\bar{S}M\}^2}$$

and the term tr{ } denotes the trace operator. The trace operator tr{ } may be defined as the sum of the elements along the main diagonal (i.e., from upper left to bottom right) of the matrix within the brackets { } (i.e., the product matrix $\overline{S}M$). In some embodiments, sample indexer 522 calculates the control limit $\zeta_k^2$ for each operating state $k \in \Re^N$. Sample indexer 522 may provide the fault detection indices I(x) and the control limits $\zeta^2$ to fault detector 524.

Still referring to FIG. 11, memory 516 is shown to include a fault detector 524. Fault detector 524 may be configured to determine whether a given sample x is normal or faulty with respect to a particular operating state. Fault detector 524 is shown receiving the fault detection indices I(x) and the control limits $\zeta^2$ from sample indexer 522. As described above, both the fault detection index I(x) and the control limit $\zeta^2$ may be a function of the model parameters 532 for a particular operating state (e.g., state k). The fault detection index I(x) may also be a function of the sample vector x scaled to the particular operating state (e.g., $\overline{x}_k$).

Fault detector 524 may determine whether a given sample x is normal or faulty with respect to an operating state by comparing the fault detection index I(x) for the sample with the control limit $\zeta^2$. For example, fault detector 524 may determine that the sample x is normal with respect to state k if the fault detection index for the sample (scaled to state k) is within the control limit $\zeta^2$ for state k (i.e., $I(x)_k \leq \zeta_k^2$). A sample that is normal with respect to state k indicates that the monitored system, device, or process is operating in state k when the sample is obtained. Fault detector 524 may determine that the sample x is faulty with respect to state k if the fault detection index for the sample (scaled to state k) is not within the control limit $\zeta^2$ for state k (i.e., $I(x)_k > \zeta_k^2$). A sample that is faulty with respect to state k indicates that the monitored system, device, or process is not operating in state k when the sample is obtained.

In some embodiments, fault detector 524 iterates through each of the operating states $k \in \Re^N$, comparing the fault detection index $I(x)_k$ of the sample for the sample with the control limit $\zeta_k^2$. Fault detector 524 may identify state k as the current operating state in response to a determination that the fault detection index $I(x)_k$ is within the control limit $\zeta_k^2$. If fault detector 524 is unable to identify a current operating state, fault diagnoser 538 may perform a voting-based diagnosis to identify the current operating state. This may occur when the fault detection index $I(x)_k$ is not within the control limit $\zeta_k^2$ for any of the stored operating states $k \in \Re^N$. For example, if fault detector 524 determines that the fault detection index $I(x)_k$ is not within the corresponding control limit $\zeta_k^2$ for any of the stored operating states, fault detector 524 may trigger fault diagnoser 538 to perform the voting-based diagnosis.

Once a current operating state has been identified (by fault detector 524 and/or fault diagnoser 538), fault detector 524 may determine whether the identified operating state is normal or faulty. For example, fault detector 524 may access a stored list, database, or other mapping that indicates which operating states are normal and which operating states are faulty. If the identified operating state is a normal operating state, fault detector 524 may not output a fault detection 534. However, if the identified operating state is a faulty operating state, fault detector 524 may output a fault detection 534. Fault detections 534 may be stored in memory and/or communicated to client devices 448, remote systems and applications 444, building subsystems 428, or any other external system or device.

Still referring to FIG. 11, memory 516 is shown to include a direction extractor 526. Direction extractor 526 may be configured to determine directions between various sets of the monitored variables 506. In some embodiments, the directions include vectors that indicate the direction $\theta_{jk}$ of a given operating state (e.g., state j characterized by sample matrix $X_j$) from the perspective of another operating state (e.g., state k characterized by sample matrix $X_k$). Several examples of such vectors are shown in FIGS. 7-10B. In some embodiments, the directions include vectors that indicate the direction $\theta_{jk}$ of a set of faulty samples $X_f$ that have not yet been identified as belonging to a particular operating state.

Direction extractor 526 is shown receiving the scaled sample matrices $\overline{X}_{jk}$ from data scaler 520. As previously described, the scaled sample matrix $\overline{X}_{jk}$ denotes the sample matrix $X_j$ from state j that has been scaled with respect to state k (i.e., using the mean $b_k$ and standard deviation $V_k$ from state k). For example, data scaler 520 may calculate the scaled sample matrix $\overline{X}_{jk}$ using the following equation:

$$\overline{X}_{jk} = (X_j - 1_m b_k^T) V_k^{-1}$$

where $V_k$ is the standard deviation for state k, $b_k$ is the mean for state k, and the matrix $\overline{X}_{jk}$ is the sample matrix $X_j$ scaled with respect to operating state k. The scaled sample matrix $\overline{X}_{jk}$ may also represent the sample matrix $X_f$ that has been scaled with respect to state k by substituting $X_f$ for $X_j$ in the previous equation.

In some embodiments, direction extractor 526 determines the direction $\theta_{jk}$ by performing singular value decomposition (SVD) on the scaled sample matrix $\overline{X}_{jk}$. For example, direction extractor 526 may factor the scaled sample matrix $\overline{X}_{jk}$ as shown in the following equation:

$$\overline{X}_{jk} = L_{jk} D_{jk} L_{jk}^T$$

where the matrix $L_{jk}$ consists of n singular vectors $L_{jk} = [l_1 \ l_2 \ \ldots \ l_n]$. Direction extractor 526 may extract the direction $\theta_{jk}$ from the matrix $L_{jk}$. In some embodiments, direction extractor 526 selects the left or right singular vector in $L_{jk}$ as the direction $\theta_{jk}$ (e.g., $\theta_{jk} = [l_1]$ or $\theta_{jk} = [l_n]$).

In some embodiments, direction extractor 526 selects the first l singular vectors in $L_{jk}$ as the direction $\theta_{jk}$, where l is the number of singular vectors that brings the fault detection index of all of the reconstructed samples $z_{jk}$ within the control limit $\zeta_k^2$ (e.g., $\theta_{jk} = [l_1 \ l_2 \ \ldots \ l_l]$). The reconstructed samples $z_{jk}$ may be generated by sample reconstructor 536 by reconstructing each of the samples in $\overline{X}_{jk}$ along the direction $\theta_{jk}$ (e.g., by subtracting a multiple of $\theta_{jk}$ from each sample, described in greater detail below). The notation $z_{jk}$ indicates that a sample $x_j$ from state j is scaled with respect to state k and reconstructed along the direction $\theta_{jk}$ of state j from the perspective of state k.

In some embodiments, direction extractor 526 augments $\theta_{jk}$ with the next singular vector in $L_{jk}$ until the direction $\theta_{jk}$ causes the fault detection indices of all the reconstructed samples $z_{jk}$ to be within the control limit $\zeta_k^2$. For example, direction extractor 526 may initially select $\theta_{jk} = [l_1]$. Sample reconstructor 536 may reconstruct all of the samples $\overline{X}_{jk}$ along the direction $\theta_{jk} = [l_1]$ to generate reconstructed samples $z_{jk}$. Sample indexer 522 may calculate fault detection indices $I(z_{jk})$ of the reconstructed samples $z_{jk}$, which may be compared with the control limit $\zeta_k^2$ by fault detector 524. If the fault detection indices $I(z_{jk})$ of all the reconstructed samples are within the control limit $\zeta_k^2$, direction extractor 526 may determine that $\theta_{jk} = [l_1]$. If the fault detection indices $I(z_{jk})$ of all the reconstructed samples are not within the control limit $\zeta_k^2$, direction extractor 526 may augment $\theta_{jk}$ with the next singular vector in $L_{jk}$ (e.g., $\theta_{jk} = [l_1 \ l_2]$). This process may be repeated until the fault detection indices of all of the samples $z_{jk}$ reconstructed along direction $\theta_{jk}$ are within the control limit $\zeta_k^2$.

In some embodiments, direction extractor 526 simplifies the direction extraction process based on the observation that the right singular vectors of $\overline{X}_{jk}$ and $\overline{X}_{jk}^T\overline{X}_{jk}$ are the same. For example, direction extractor 526 may be configured to calculate the product $\overline{X}_{jk}^T\overline{X}_{jk}$ of the scaled sample matrix $\overline{X}_{jk}$ using the following equation:

$$\overline{X}_{jk}^T\overline{X}_{jk} = V_k^{-1}(X_j^T - b_k 1_{m_j}^T)(X_j - 1_{m_j}b_k^T)V_k^{-1}$$

$$\overline{X}_{jk}^T\overline{X}_{jk} = V_k^{-1}(X_j^T X_j + m_j(b_j - b_k)(b_j - b_k)^T - m_j b_j b_j^T)V_k^{-1}$$

Direction extractor 526 may perform singular value decomposition on the smaller matrix $\overline{X}_{jk}^T\overline{X}_{jk}$ as shown in the following equation:

$$\overline{X}_{jk}^T\overline{X}_{jk} = L_{jk}D_{jk}^2 L_{jk}^T$$

where the matrix $L_{jk}$ consists of n singular vectors $L_{jk} = [l_1\ l_2\ \ldots\ l_n]$. Direction extractor 526 may extract the direction $\theta_{jk}$ from the matrix $L_{jk}$ as previously described. For example, direction extractor 526 may initially select $\theta_{jk} = [l_1]$ and iteratively augment $\theta_{jk}$ with the next singular vector in $L_{jk}$ (e.g., $\theta_{jk} = [l_1\ l_2]$, $\theta_{jk} = [l_1\ l_2\ l_3]$, etc.) until the direction $\theta_{jk}$ causes the fault detection indices of all the reconstructed samples $z_{jk}$ to be within the control limit $\zeta_k^2$.

In some embodiments, direction extractor 526 further simplifies the direction extraction process based on the observation that when all of the fault detection indices $I(z_{jk})$ of the reconstructed samples are less than or equal to the control limit $\zeta_k^2$, the sum of all these indices will be less than the control limit $\zeta_k^2$ multiplied by the number of samples m in the scaled sample matrix $\overline{X}_{jk}$. This relationship is shown in the following equation:

$$\sum_{k=1}^{m} x_k^T Q_{jk} x_k \leq m\zeta_k^2$$

where the product $x_k^T Q_{jk} x_k = I(z_{jk})$. Direction extractor 526 may calculate the matrix $Q_{jk}$ as follows:

$$Q_{jk} = M - M\theta_{jk}(\theta_{jk}^T M \theta_{jk})^{-1}\theta_{jk}^T M$$

where M is calculated based on the model parameters 532 for state k, as described with respect to sample indexer 522.

Direction extractor 526 may apply the trace operator to the sum $\Sigma_{k=1}^{m} x_k^T Q_{jk} x_k$ and simplify the preceding inequality as follows:

$$\text{tr}\left\{\sum_{k=1}^{m} x_k^T Q_{jk} x_k\right\} \leq m\zeta_k^2$$

$$\sum_{k=1}^{m} \text{tr}\{x_k^T Q_{jk} x_k\} \leq m\zeta_k^2$$

$$\sum_{k=1}^{m} \text{tr}\{Q_{jk} x_k x_k^T\} \leq m\zeta_k^2$$

$$\text{tr}\left\{Q_{jk} \sum_{k=1}^{m} x_k x_k^T\right\} \leq m\zeta_k^2$$

$$\text{tr}\{Q_{jk} \overline{X}_{jk}^T \overline{X}_{jk}\} \leq m\zeta_k^2$$

$$\text{tr}\{Q_{jk} \overline{S}_{jk}\} \leq \zeta_k^2$$

where $\overline{S}_{jk}$ is the covariance of the scaled sample matrix $\overline{X}_{jk}$ $$\left(\text{i.e., } \overline{S}_{jk} = \frac{1}{m}\overline{X}_{jk}^T\overline{X}_{jk}\right).$$

Advantageously, this formulation allows direction extractor 526 to determine the number l of singular vectors in $\theta_{jk}$ using only the trace of the product $Q_{jk}\overline{S}_{jk}$ and the control limit $\zeta_k^2$.

For example, direction extractor 526 may initially select $\theta_{jk} = [l_1]$ and iteratively augment $\theta_{jk}$ with the next singular vector in $L_{jk}$ (e.g., $\theta_{jk} = [l_1\ l_2]$, $\theta_{jk} = [l_1\ l_2\ l_3]$, etc.) until the direction $\theta_{jk}$ causes the trace of $Q_{jk}\overline{S}_{jk}$ to be within the control limit $\zeta_k^2$ (i.e., $\text{tr}\{Q_{jk}\overline{S}_{jk}\} \leq \zeta_k^2$).

Still referring to FIG. 11, memory 516 is shown to include a sample reconstructor 536. Sample reconstructor 536 may be configured to reconstruct samples of the monitored variables 506 along the directions to various operating states. For example, sample reconstructor 536 may receive samples $\overline{x}_k$ of the monitored variables 506 from data scaler 520, where the notation $\overline{x}_k$ indicates that the samples have been scaled with respect to state k. The scaled samples $\overline{x}_k$ may have an unknown operating state (e.g., new samples of the monitored variables 506 that have not yet been classified as belonging to any operating state) or a known operating state (e.g., training values of the monitored variables 506 that are specified as belonging to a particular operating state j). Sample reconstructor 536 may be configured to reconstruct the samples $\overline{x}_k$ along the directions $\theta_{jk}$ to each of the other stored operating states $j \in \mathfrak{R}^{N-1}$.

In some embodiments, sample reconstructor 536 characterizes samples $\overline{x}_k$ of the monitored variables 506 as having a fault-free part $x_k^*$ and a faulty part $f\theta$ with respect to a particular operating state. For example, each sample can be broken into parts, as shown in the following equation:

$$\overline{x}_k = x_k^* + f\theta$$

where the fault-free part $x_k^*$ is representative of a sample from the operating state (e.g., the mean $b_k$ of state k) and the faulty part consists of a fault magnitude f and a fault direction $\theta$.

Sample reconstructor 536 may receive the directions $\theta_{jk}$ from direction extractor 526 and the scaled samples $\overline{x}_k$ from data scaler 520. In some embodiments, sample reconstructor 536 receives multiple scaled values of the same sample, where each scaled value is scaled to a different operating state. For example, data scaler 520 may provide sample reconstructor 536 with a sample $\overline{x}_k$ scaled to each operating state $k \in \mathfrak{R}^N$. Similarly, direction extractor 526 may provide sample reconstructor 536 with directions $\theta_{jk}$ from each known operating state k to each other known operating state $j \in \mathfrak{R}^{N-1}$.

Sample reconstructor 536 may reconstruct the samples $\overline{x}_k$ along the directions $\theta_{jk}$. Reconstructing a sample $\overline{x}_k$ along a direction $\theta_{jk}$ may include finding the value $f_{jk}$ that minimizes the fault detection index of the reconstructed measurement $z_{jk}$, where $z_{jk}$ is defined as follows:

$$z_{jk} = \overline{x}_k - f_{jk}\theta_{jk}$$

In the preceding equation, $\theta_{jk}$ is the assumed direction of the fault from the perspective of state k. However, it should be understood that the assumed direction $\theta_{jk}$ does not necessarily correspond to the actual direction of the fault (i.e., the actual direction of the deviation of the sample relative to state k). In some embodiments, sample reconstructor 536 reconstructs each sample $\overline{x}_k$ along multiple different directions $\theta_{jk}$, where each direction represents a direction from state k to one of the other operating states j. For example, sample reconstructor 536 may reconstruct the sample $\overline{x}_k$ along each direction $\theta_{jk}$, where $j \in \mathfrak{R}^{N-1}$.

Sample reconstructor 536 may use sample indexer 522 to calculate the fault detection index $I(z_{jk})$ of each reconstructed sample. In some embodiments, sample indexer 522 calculates the fault detection indices $I(z_k)$ using the following equation:

$$I(z_{jk}) = \overline{x}_k^T(M - M\theta_{jk}(\theta_{jk}^T M \theta_{jk})^{-1}\theta_{jk}^T M)\overline{x}_k = \overline{x}_k^T Q_{jk}\overline{x}_k$$

where $Q_{jk}=M-M\theta_{jk}(\theta_{jk}^T M\theta_{jk})^{-1}\theta_{jk}^T M$. Sample indexer 522 may provide the fault detection indices $I(z_{jk})$ to fault diagnoser 538.

Still referring to FIG. 11, memory 516 is shown to include a fault diagnoser 538. Fault diagnoser 538 may be configured to perform a voting-based fault diagnosis to determine the operating state for a sample x of the monitored variables 506. In some embodiments, the voting-based fault diagnosis is performed when fault detector 524 fails to identify the current operating state of a new sample x of the monitored variables 506. For example, each new sample x of the monitored variables 506 may be scaled with respect to each operating state $k \in \Re^N$ by data scaler 520. Sample indexer 522 may index each scaled sample $\bar{x}_k$ to produce a fault detection index I(x) with respect to state k. Fault detector 524 may iteratively compare each fault detection index I(x) to the control limit $\zeta_k^2$ for the corresponding state. For each state k, if the fault detection index I(x) is within the control limit $\zeta_k^2$ (i.e., $I(x) \leq \zeta_k^2$, fault detector 524 may determine that state k is the current operating state. However, if the fault detection index I(x) is not within the control limit $\zeta_k^2$ (i.e., $I(x) > \zeta_k^2$, fault detector 524 may determine that state k is not the current operating state. Fault detector 524 may iterate through each state k until the current operating state is identified or all of the operating states are exhausted. If fault detector 524 fails to identify the current operating state, fault diagnoser 538 may perform the voting-based fault diagnosis.

In some embodiments, the voting-based fault diagnosis includes determining which of the stored operating states $j \in \Re^{N-1}$ has the same or similar direction $\theta_{jk}$ as the new sample x of the monitored variables 506 from the perspective of each operating state $k \in \Re^N$. Each operating state k may generate a vote for one of the other operating states j (or for an unknown operating state) based on the directions $\theta_{jk}$ of the other operating states j from the perspective of state k. As described above, each new sample x of the monitored variables 506 may be scaled with respect to each operating state k by data scaler 520. This results in a set of N scaled samples $\bar{x}_k$ for each actual sample x of the monitored variables 506. Each scaled sample $\bar{x}_k$ may be reconstructed by sample reconstructor 536 along the directions $\theta_{jk}$ to each of the other operating states j. This results in a set of N×(N−1) reconstructed samples $z_{jk}$ for each actual sample x of the monitored variables 506. Each reconstructed sample $z_{jk}$ may be indexed by sample indexer 522, producing a set of N×(N−1) fault detection indices $I(z_{jk})$.

Fault diagnoser 538 may compare each fault detection index $I(z_{jk})$ to the control limit $\zeta_k^2$ for the corresponding state k. If the fault detection index $I(z_{jk})$ is within the control limit $\zeta_k^2$ (i.e., $I(z_{jk}) \leq \zeta_k^2$), fault diagnoser 538 may determine that the direction $\theta_{jk}$ is the actual direction of the fault from the perspective of state k. In response to determining that the direction $\theta_{jk}$ is the actual direction of the fault from the perspective of state k, fault diagnoser 538 may record a vote for state j (e.g., incrementing a stored value associated with state j). However, if the fault detection index $I(z_{jk})$ is not within the control limit $\zeta_k^2$ (i.e., $I(z_{jk}) > \zeta_k^2$), fault diagnoser 538 may determine that the direction $\theta_{jk}$ is not the actual direction of the fault from the perspective of state k and may not record a vote for state j. In some embodiments, fault diagnoser 538 records votes using the following voting algorithm:

$$V_{jk} = \begin{cases} 1, & \text{if } I(z_{jk}) \leq \zeta_k^2 \\ 0, & \text{otherwise} \end{cases}$$

where $V_{jk}$ is a variable indicating a vote for state j from the perspective of state k. A value of $V_{jk}=1$ indicates that an affirmative vote was recorded for state j from the perspective of state k, whereas a value of $V_{jk}=0$ indicates that a non-affirmative vote was recorded for state j from the perspective of state k.

Fault diagnoser 538 may repeat this process for each of the stored operating states k, recording a vote from the perspective of each operating state k. Each state k may vote for one or more of the other stored states j or for an unknown state. A state k may vote for an unknown state if none of the fault detection indices $I(z_{jk})$ are within the control limit $\zeta_k^2$ for the corresponding state k. Once the votes are recorded from the perspective of each state k, fault diagnoser 538 may determine which of the operating states has the most votes. Fault diagnoser 538 may determine that the state with the most votes is the current operating state. In some embodiments, fault diagnoser 538 counts votes using the following counting algorithm:

$$V_j^T = \sum_{k=1}^{N} V_{jk}$$

where $V_j^T$ is a variable representing the total number of votes for state j from each of states $k \in \Re^N$ and $V_{jk}$ is either 1 (if state k voted for state j) or 0 (if state k did not vote for state j).

Still referring to FIG. 11, memory 516 is shown to include a model updater 540. Model updater 540 may be configured to update the PCA models 530 with new samples of the monitored variables 506. For example, a given state k may be modeled by PCA modeler 528 with an existing data set $X_1$ which includes $m_1$ samples of the monitored variables 506. Model updater 540 may add a new set of data $X_2$ with $m_2$ samples to the existing data set. The updated data set becomes $X_u = [X_1^T \ X_2^T]^T$ with $m_u = m_1 - m_2$.

Model updater 540 may calculate the product matrix $X_u^T X_u$ and mean $b_u$ of the updated data set $X_u$ using the following equations:

$$X_u^T X_u = X_1^T X_1 + X_2^T X_2$$

$$b_u = \frac{1}{m_u} X_u^T 1_{m_u}$$

where $1_{m_u} = [1_{m_1} \ 1_{m_2}]^T$. Accordingly, the mean $b_u$ can be simplified as follows:

$$b_u = \frac{1}{m_u} X_1^T 1_{m_1} + \frac{1}{m_u} X_2^T 1_{m_2}$$

$$b_u = \frac{m_1}{m_u} b_1 + \frac{m_2}{m_u} b_2$$

Data scaler 520 may use the product matrix $X_u^T X_u$ to calculate the covariance matrix $S_u$ and standard deviation $V_u$ of the updated data set $X_u$ as shown in the following equations:

$$S_u = \frac{1}{m_u}(X_u^T X_u - m_u b_u b_u^T)$$

$$V_u = \sqrt{\text{diag}(S_u)}$$

PCA modeler 528 may use these variables as updated model parameters 532 to update PCA models 530.

Still referring to FIG. 11, memory 516 is shown to include a building controller 544. Building controller 544 may be configured to control one or more buildings, building systems, or building subsystems. For example, building controller 544 may utilize closed loop control, feedback control, PI control, model predictive control, or any other type of automated building control methodology to generate control signals for building subsystems 428. In some embodiments, building controller 544 uses the fault detections, fault diagnoses, and/or detected operating states to determine an appropriate control signal for building subsystems 428. In other words, the control signals generated by building controller 544 may be based on the current operating state, as determined by fault detector 524 and/or fault diagnoser 538.

Building controller 544 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 510. In some embodiments, building controller 544 receives samples of the monitored variables 506. Building controller 544 may apply the monitored variables 506 and/or other inputs to a control algorithm or model (e.g., a building energy use model) to determine an output for one or more building control devices (e.g., dampers, air handling units, chillers, boilers, fans, pumps, etc.) in order to affect a variable state or condition within the building (e.g., zone temperature, humidity, air flow rate, etc.). Building controller 544 may operate the building control devices to maintain building conditions within a setpoint range, to optimize energy performance (e.g., to minimize energy consumption, to minimize energy cost, etc.), and/or to satisfy any constraint or combination of constraints as may be desirable for various implementations.

State Modeling Process

Figure 12:
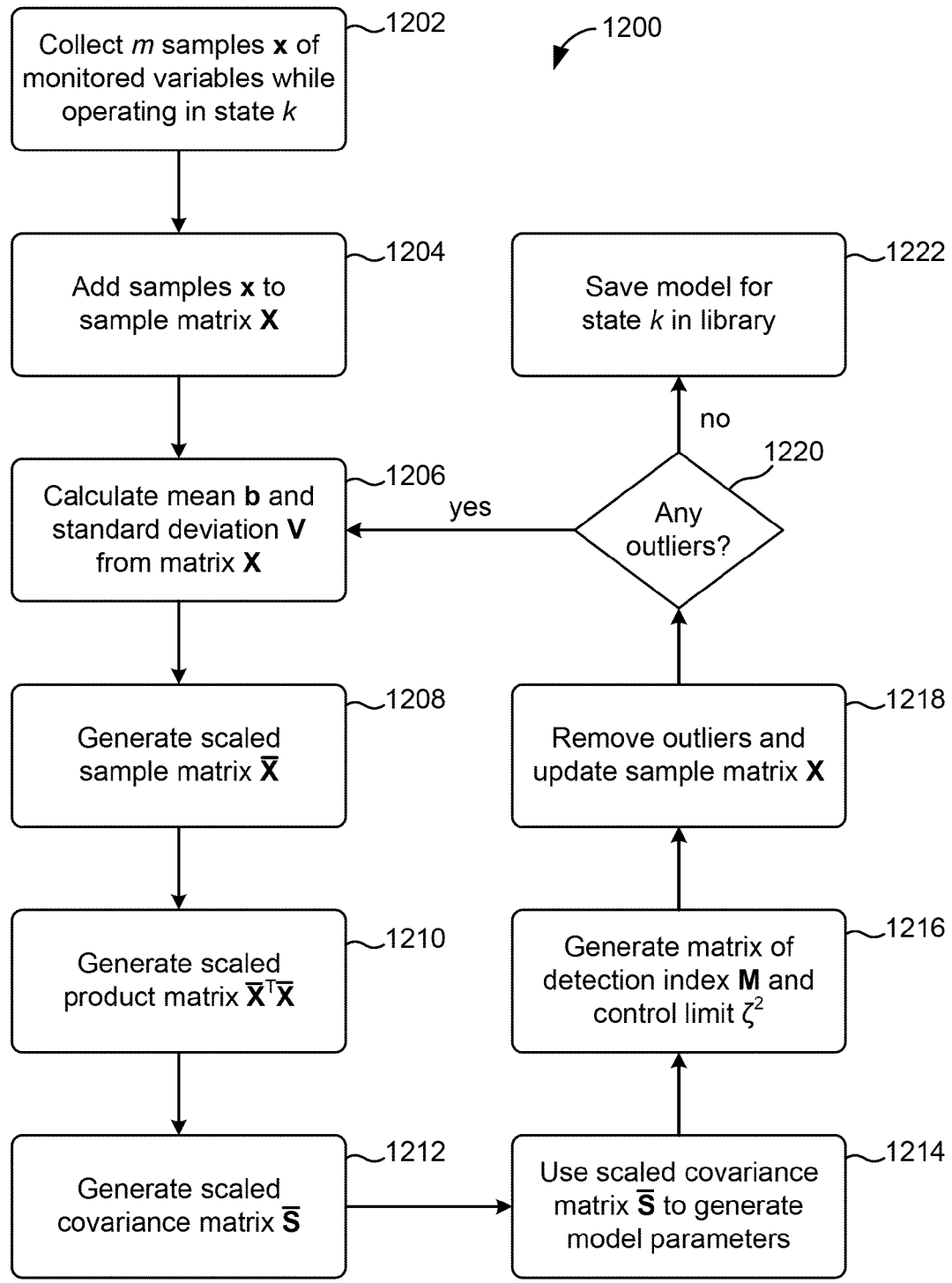
FIG. 12 is a flowchart of a process which may be performed by the FDD system of FIG. 5 to generate a PCA model of a state, according to an exemplary embodiment.

Referring now to FIG. 12, a flowchart of a process 1200 for generating a PCA model of a state is shown, according to an exemplary embodiment. Process 1200 may be performed by FDD system 502 and/or various components thereof to generate and store PCA models 530 for a plurality of operating states. In some embodiments, process 1200 is performed once for each operating state to generate a PCA model for that state. Process 1200 may be repeated any number of times to generate any number of PCA models.

Process 1200 is shown to include collecting m samples x of monitored variables while operating in state k (step 1202). In some embodiments, step 1202 is performed by variable monitor 518, as described with reference to FIG. 11. The monitored variables may indicate the performance of a monitored system, device, or process. For example, the monitored variables may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables may be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1202 may include organizing samples of the n time-series variables in a sample vector x, where $x \in \Re^n$. The values of the monitored variables in a sample vector x may be recorded or collected at the same time (e.g., measurements of the monitored variables at a particular time). Step 1202 may include collecting m samples of each of the n time-series variables (e.g., at n different times).

Still referring to FIG. 12, process 1200 is shown to include adding the samples x to a sample matrix X (step 1204). Step 1204 may include generating sample matrix X, where $X \in \Re^{m \times n}$. The sample matrix X may include m samples of each of the n time-series variables, as shown in the following equation:

$$X = [x_1 \; x_2 \; \ldots \; x_m]^T$$

where each of the m sample vectors x (e.g., $x_1$, $x_2$, etc.) includes a value for each of the n time-series variables.

In some embodiments, step 1204 includes grouping sample vectors x based on an operating state during which the sample vectors x were collected. For example, step 1204 may include grouping sample vectors x collected during a first operating state (e.g., state 1) into a first sample matrix $X_1$, and grouping the sample vectors x collected during a second operating state (e.g., state 2) into a second sample matrix $X_2$. Each of the sample matrices X may include values of the monitored variables that represent a particular operating state. During a training period, the operating states associated with each of the sample vectors x may be specified by a user or indicated by another data source.

Process 1200 is shown to include calculating a mean b and standard deviation V from the matrix X (step 1206). In some embodiments, step 1206 is performed by data scaler 520, as described with reference to FIG. 11. The mean b of a set of sample vectors x may be calculated using the following equation:

$$b = \frac{1}{m} \sum_{i=1}^{m} x_i = \frac{1}{m} X^T 1_m$$

where $x_i$ represents the ith sample vector x for a particular operating state, $1_m$ is a vector of size m whose elements are all 1 (i.e., $1_m = [1 \; 1 \; \ldots \; 1]$), and $X^T$ is the transpose of the sample matrix X generated in step 1204.

The standard deviation V may be calculated from the covariance matrix S of the sample matrix X generated in step 1204. For example, step 1206 may include calculating the covariance matrix S using the following equation:

$$S = \frac{1}{m} \sum_{i=1}^{m} (x_i - b)(x_i - b)^T$$

$$S = \frac{1}{m}(X - 1_m b^T)(X - 1_m b^T)^T$$

$$S = \frac{1}{m}(X^T X - mbb^T)$$

The standard deviation V may then be calculated by taking the square root of the diagonal matrix that contains the diagonal elements of the covariance matrix S, as shown in the following equation:

$$V=\sqrt{\text{diag}(S)}$$

Still referring to FIG. 12, process 1200 is shown to include generating a scaled sample matrix $\overline{X}$ (step 1208), a scaled product matrix $\overline{X}^T\overline{X}$ (step 1210), and a scaled covariance matrix $\overline{S}$ (step 1212). Step 1208 may include using the mean b and standard deviation V calculated in step 1206 to scale the sample matrix X generated in step 1204. For example, step 1208 may include scaling the sample matrix X using the following equation:

$$\overline{X}=(X-1b^T)V^{-1}$$

Step 1210 may include using the mean b and standard deviation V calculated in step 1206 to calculate the scaled product matrix $\overline{X}^T\overline{X}$ according to the following equation:

$$\overline{X}^T\overline{X}=V^{-1}(X^TX-mbb^T)V^{-1}$$

Step 1212 may include scale the covariance matrix S calculated in step 1206 using the following equation:

$$\overline{S} = \frac{1}{m}\overline{X}^T\overline{X}$$
$$\overline{S} = \frac{1}{m}V^{-1}(X^TX - mbb^T)V^{-1}$$
$$\overline{S} = V^{-1}SV^{-1}$$

Still referring to FIG. 12, process 1200 is shown to include using the scaled covariance matrix $\overline{S}$ to generate model parameters for the PCA model (step 1214). In some embodiments, step 1214 is performed by PCA modeler 528, as described with reference to FIG. 11. Step 1214 may include performing singular value decomposition (SVD) on the scaled covariance matrices $\overline{S}$ generated in step 1212. SVD is a statistical technique in which a factorization of the form $\overline{S}=UDU^T$ is obtained from a real or complex matrix (i.e., the scaled covariance matrix $\overline{S}$). Step 1214 may include factoring the scaled covariance matrix $\overline{S}$ as shown in the following equation:

$$\overline{S} = UDU^T$$
$$\overline{S} = [P \quad \tilde{P}]\begin{bmatrix}\Lambda & 0 \\ 0 & \tilde{\Lambda}\end{bmatrix}[P \quad \tilde{P}]^T$$
$$\overline{S} = P\Lambda P^T + \tilde{P}\tilde{\Lambda}\tilde{P}^T$$

where the matrix P represents the loadings of the PCA model and consists of the first l singular vectors in U that correspond to the largest l singular values in D. These singular values are represented in $\Lambda$. The residuals of the singular values are stored in $\tilde{\Lambda}$ and the residuals of the vectors are stored in $\tilde{P}$. In some embodiments, the singular values $\Lambda$ and $\tilde{\Lambda}$ and the vectors P and $\tilde{P}$ are the model parameters generated in step 1214.

In some embodiments, step 1214 uses only the scaled covariance matrix $\overline{S}$ for a given state to generate the model parameters for the corresponding PCA model. Advantageously, this allows process 1200 to generate the model parameters without requiring the sample data (i.e., the sample vectors x and/or the sample matrices X) to be stored or maintained in memory once the scaled covariance matrix $\overline{S}$ is generated. For example, in some embodiments, process 1200 includes deleting or discarding the original sample data once the scaled covariance matrix $\overline{S}$ is generated. The PCA models can be used to reconstruct the original scaled covariance matrices $\overline{S}$. If the means b and standard deviations V of the sample data are known, the original covariance matrices S can also be reconstructed.

Process 1200 is shown to include generating a matrix of a detection index M and a control limit $\zeta^2$ (step 1216). In some embodiments, step 1216 is performed by sample indexer 522, as described with reference to FIG. 11. The matrix M may be a function of the model parameters generated in step 1214. For example, step 1216 may include calculating the matrix M using the following equation:

$$M = \frac{P\Lambda^{-1}P^T}{\tau^2} + \frac{\tilde{P}\tilde{P}^T}{\delta^2}$$

where P, $\Lambda$, and $\tilde{P}$ are the model parameters generated in step 1214. The parameters $\tau^2$ and $\delta^2$ may be control limits of the Hotelling's $T^2$ statistic and the squared prediction error (SPE), respectively. Step 1216 may include calculating $\tau^2$ using the following equation:

$$\tau^2=\chi_\alpha^2(l)$$

where the term $\chi_\alpha^2(l)$ represents the inverse value of a chi square distribution with l degrees of freedom and a confidence level of $(1-\alpha)\times100\%$. Step 1216 may include calculating the control limit $\delta^2$ using the following equation:

$$\delta^2=g_s\chi_\alpha^2(h_s)$$

where $$g_s = \frac{\omega_2}{\omega_1}, \quad h_s = \frac{\omega_1^2}{\omega_2}, \quad \omega_1 = \sum_{i=l+1}^{n}\lambda_i, \text{ and } \omega_2 = \sum_{i=l+1}^{n}\lambda_i^2.$$

The parameter $\lambda_i$ may be the ith singular value of the scaled covariance matrix $\overline{S}$ for the operating state.

The control limit $\zeta^2$ may also be a function of the model parameters generated in step 1214. In some embodiments, step 1216 includes calculating the control limit $\zeta^2$ using the following equation:

$$\zeta^2=g_z\chi_\alpha^2(h_z)$$

where $g_z$ and $h_z$ are defined as follows:

$$g_z = \frac{tr\{\overline{S}M\}^2}{tr\{\overline{S}M\}}, \quad h_z = \frac{[tr\{\overline{S}M\}]^2}{tr\{\overline{S}M\}^2}$$

and the term tr{ } denotes the trace operator. The trace operator tr{ } may be defined as the sum of the elements along the main diagonal (i.e., from upper left to bottom right) of the matrix within the brackets { } (i.e., the product matrix $\overline{S}M$).

Still referring to FIG. 12, process 1200 is shown to include removing outliers and updating the sample matrix X (step 1218). Step 1218 may include scaling each of the samples x in the sample matrix X and calculating an index of each scaled sample. Samples x may be scaled using the mean b and standard deviation V calculated in step 1206. For example, step 1218 may include scaling a sample vector x using the following equation:

$$\bar{x}=V^{-1}(x-b)$$

In some embodiments, the sample indices are calculated from the scaled samples $\bar{x}$ as described with reference to sample indexer 522. For example, step 1218 may include using the scaled sample vectors $\bar{x}$ to generate fault detection indices according to the following equation:

$$I(x)=x^TMx$$

where I(x) is the fault detection index, x is the scaled sample vector $\bar{x}$ and M is the matrix generated in step 1216.

Step 1218 may include comparing the index I(x) of each scaled sample with the control limit $\zeta^2$ calculated in step 1216. If the index for a particular sample x is greater than the control limit (i.e., $I(x)>\zeta^2$), step 1218 may include determining that the sample x is an outlier. If the index for a particular sample x is not greater than the control limit (i.e., $I(x)\leq\zeta^2$), step 1218 may include determining that the sample x is not an outlier.

Process 1200 is shown to include determining whether any outliers have been detected (step 1220). If any outliers are detected, the outlier samples may be removed from the sample matrix X. Steps 1206-1220 may then be repeated using the updated sample matrix X. For example, the updated sample matrix X may be used to calculate an updated mean b and standard deviation V, an updated product matrix $\bar{X}^T\bar{X}$, an updated scaled covariance matrix $\bar{S}$, updated model parameters $\Lambda$ and $\tilde{\Lambda}$ and the vectors P and $\tilde{P}$, an updated matrix M, and an updated control limit $\zeta^2$. Steps 1206-1220 may be repeated until no outliers are detected in step 1220.

Process 1200 is shown to include saving the model for state k in a library (step 1222). Step 1222 may be performed in response to a determination in step 1220 that no outliers are detected. Step 1222 may include storing some or all of the variables and/or parameters generated during process 1200 in the library. For example, step 1222 may include storing the sample matrix X, the mean b and standard deviation V, the product matrix $\bar{X}^T\bar{X}$, the scaled covariance matrix $\bar{S}$, the model parameters $\Lambda$ and $\tilde{\Lambda}$ and the vectors P and $\tilde{P}$, the matrix M, and/or the control limit $\zeta^2$. The model may be stored with an indication of a particular operating state.

State Identification Process

Figure 13:
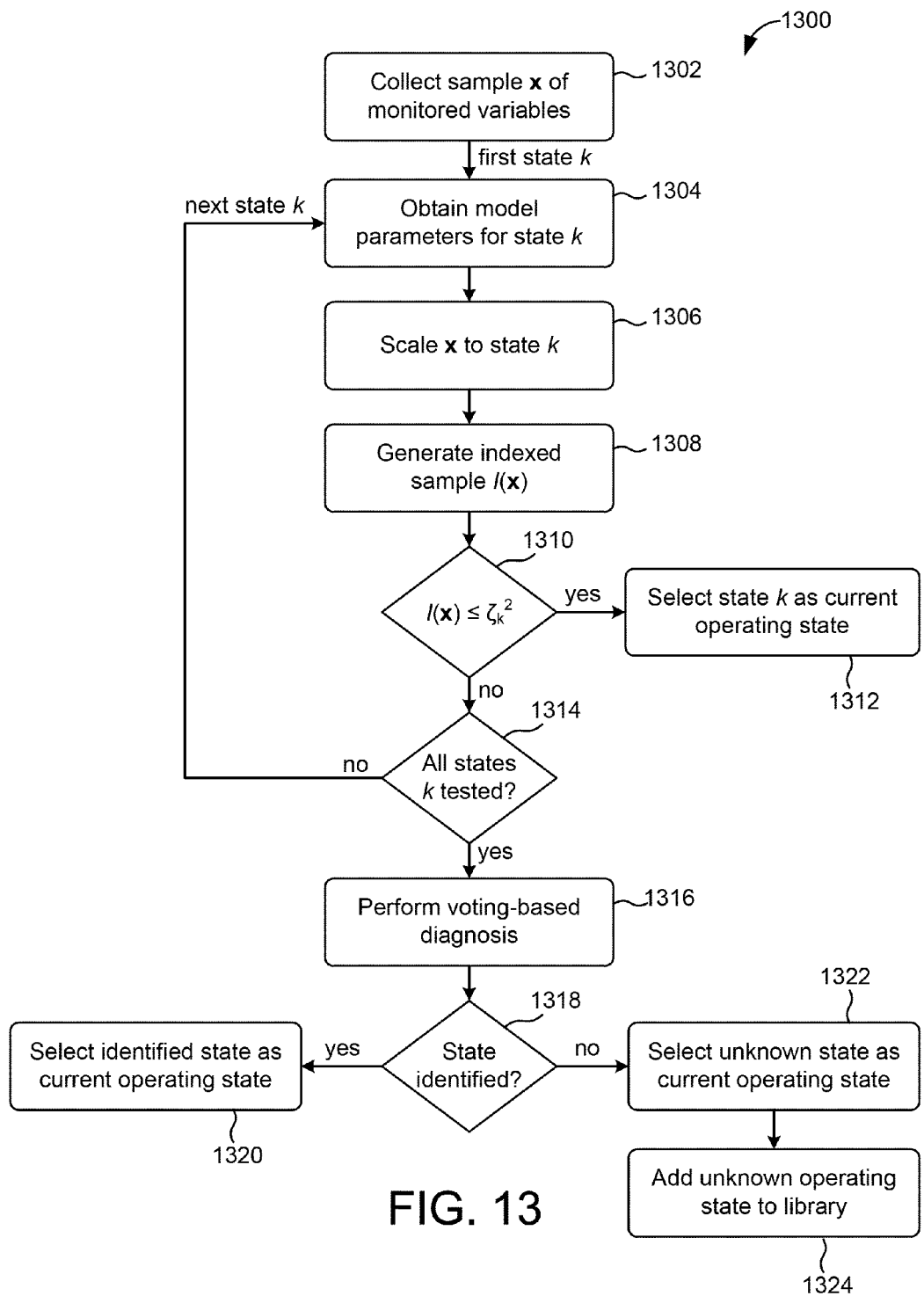
FIG. 13 is a flowchart of a process which may be performed by the FDD system of FIG. 5 to identify an operating state associated with a sample of one or more monitored variables, according to an exemplary embodiment.

Referring now to FIG. 13, a flowchart of a process 1300 for identifying an operating state associated with a sample x of one or more monitored variables is shown, according to an exemplary embodiment. Process 1300 may be performed by FDD system 502 and/or various components thereof. In some embodiments, process 1300 is performed each time a new sample x is received to determine an operating state associated with the sample x.

Process 1300 is shown to include collecting a sample x of monitored variables (step 1302). In some embodiments, step 1302 is performed by variable monitor 518, as described with reference to FIG. 11. The monitored variables may indicate the performance of a monitored system, device, or process. For example, the monitored variables may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables may be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1202 may include organizing samples of the n time-series variables in a sample vector x, where $x\in\Re^n$. The values of the monitored variables in a sample vector x may be recorded or collected at the same time (e.g., measurements of the monitored variables at a particular time).

Still referring to FIG. 13, process 1300 is shown to include obtaining model parameters for a first operating state k (step 1304). Operating state k may be any of the operating states for which a model is stored in the library. Models for various operating states may be generated and stored using process 1200, as described with reference to FIG. 12. Step 1304 may include accessing the library of stored models and retrieving the model parameters associated with the model. The model parameters retrieved in step 1304 may include, for example, the mean $b_k$, the standard deviation $V_k$, the scaled covariance matrix $\bar{S}_k$, the model parameters $\Lambda_k$ and $\tilde{\Lambda}_k$, the vectors $P_k$ and $\tilde{P}_k$, the matrix $M_k$, and/or the control limit $\zeta_k^2$. All of these parameters are given with the subscript k indicating that they describe the PCA model generated for state k.

Process 1300 is shown to include scaling the sample x to state k (step 1306) and generating a sample index I(x) (step 1308). Step 1306 may include scaling the sample x using the following equation:

$$\bar{x}_k=V_k^{-1}(x-b_k)$$

where $\bar{x}_k$ is the sample vector x scaled to state k. Step 1308 may include using the scaled sample vector $\bar{x}_k$ to generate a fault detection index according to the following equation:

$$I(x)=x^TMx$$

where I(x) is the fault detection index, x is the scaled sample $\bar{x}_k$ and M is the matrix $M_k$ retrieved as a parameter of the model for state k.

Still referring to FIG. 13, process 1300 is shown to include comparing the fault detection index I(x) to the control limit $\zeta_k^2$ for state k (step 1310). If the index I(x) for a particular scaled sample $\bar{x}_k$ is within the control limit for operating state k (i.e., $I(x)\leq\zeta_k^2$), process 1300 may include selecting state k as the current operating state (step 1312). However, if the index I(x) of the scaled sample $\bar{x}_k$ is not within the control limit for operating state k (i.e., $I(x)>\zeta_k^2$, process 1300 may determine that state k is not the current operating state and proceed to step 1314.

Process 1300 is shown to include determining whether all of the stored operating states k have been tested (step 1314). Testing a stored operating state k may include performing steps 1304-1312 with respect to the operating state k. Steps 1304-1312 may be repeated until each of the stored operating states k have been tested. In other words, steps 1304-1312 may be repeated for each operating state k to determine whether any of the stored states k are the current operating state. If all of the stored operating states k have been tested without identifying any of them as the current operating state (i.e., the result of step 1314 is "yes"), process 1300 may proceed the voting-based diagnosis (step 1316). The voting-based diagnosis may be performed by fault diagnoser 538 and is described in greater detail with reference to FIG. 14.

Process 1300 is shown to include determining whether the voting-based diagnosis has identified any of the stored operating states as the current operating state (step 1318). If the voting-based diagnosis successfully identifies a stored operating state (i.e., the result of step 1318 is "yes"), process 1300 may select the identified state as the current operating state (step 1320). However, if the voting-based diagnosis does not successfully identify a stored operating state (i.e., the result of step 1318 is "no"), process 1300 may select an unknown state as the current operating state (step 1322). If an unknown state is selected as the current operating state, the unknown operating state may be added to the library of operating states (step 1324). Step 1324 may include performing some or all of the steps of process 1200 to generate a PCA model for the unknown operating state.

Voting-Based State Identification Process

Figure 14:
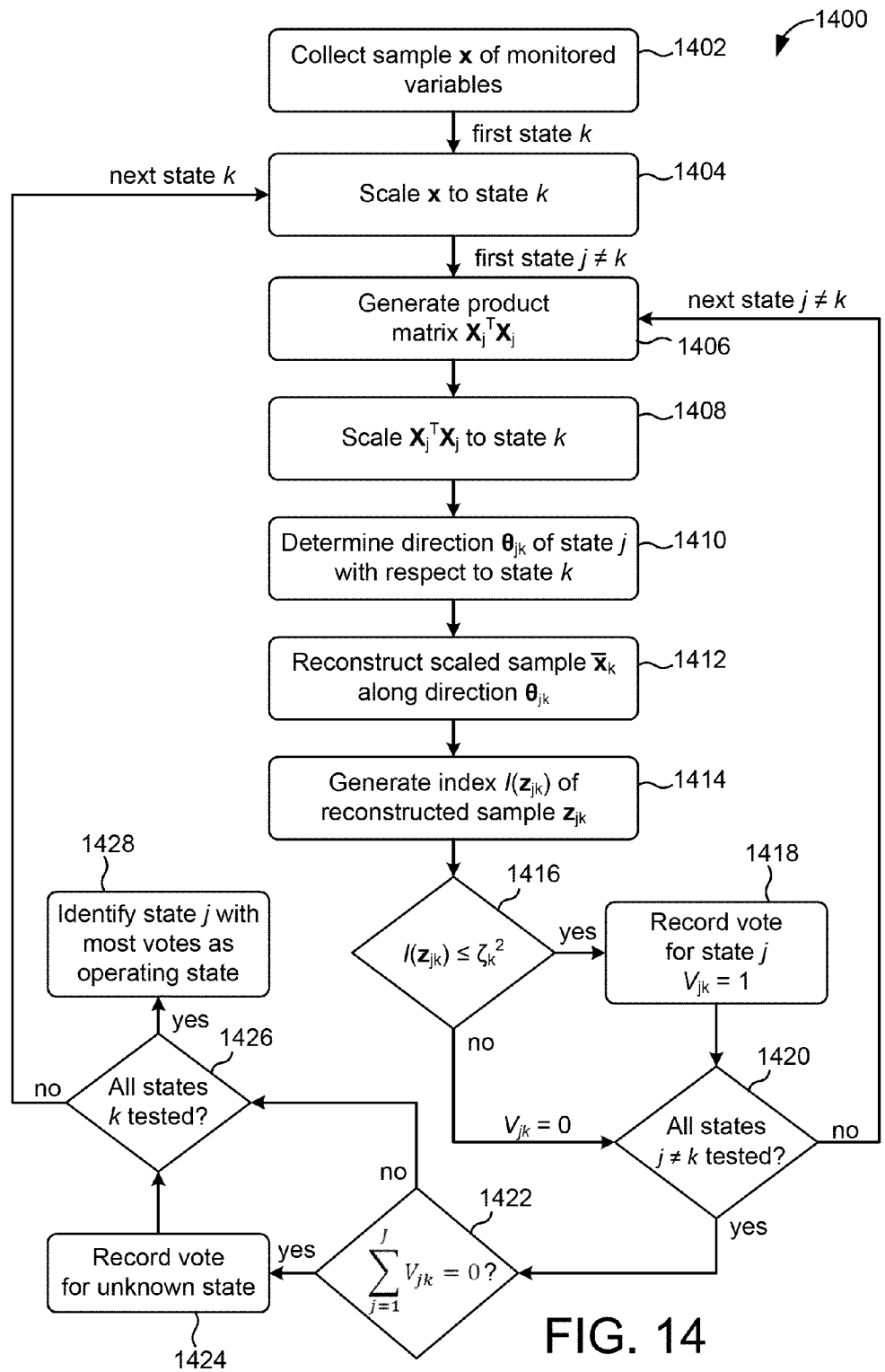
FIG. 14 is a flowchart of a voting-based state identification process which may be used by the FDD system of FIG. 5 to identify an operating state associated with a sample of one or more monitored variables, according to an exemplary embodiment.

Referring now to FIG. 14, a flowchart of a voting-based state identification process 1400 is shown, according to an exemplary embodiment. Process 1400 may be performed by FDD system 502 and/or various components thereof to identify an operating state associated with a sample x of the monitored variables. In some embodiments, process 1400 is performed when steps 1304-1312 of process 1300 fail to identify any of the stored states as the current operating state. Process 1400 may be used to accomplish step 1316 of process 1300.

Process 1400 is shown to include collecting a sample x of monitored variables (step 1402). In some embodiments, step 1402 is performed by variable monitor 518, as described with reference to FIG. 11. The monitored variables may indicate the performance of a monitored system, device, or process. For example, the monitored variables may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables may be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1202 may include organizing samples of the n time-series variables in a sample vector x, where $x \in \Re^n$. The values of the monitored variables in a sample vector x may be recorded or collected at the same time (e.g., measurements of the monitored variables at a particular time).

Process 1400 is shown to include scaling the sample x to state k (step 1404). State k may be any of the operating states for which a model is stored in the library. Models for various operating states may be generated and stored using process 1200, as described with reference to FIG. 12. Step 1404 may include scaling the sample x to state k using the following equation:

$$\bar{x}_k = V_k^{-1}(x - b_k)$$

where $V_k$ is the standard deviation for state k, $b_k$ is the mean for state k, and $\bar{x}_k$ is the sample vector x scaled to state k.

Still referring to FIG. 14, process 1400 is shown to include generating a product matrix $\bar{X}_j^T \bar{X}_j$ for another of the operating states j (step 1406). State j may be any of the stored operating states other than state k. Step 1406 may include generating a sample matrix $X_j$ which includes a collection of samples obtained while the monitored system or process was operating in state j. The transpose of the sample matrix $X_j$ may be multiplied by the sample matrix $X_j$ to generate the product matrix $\bar{X}_j^T \bar{X}_j$.

Process 1400 is shown to include scaling the product matrix $\bar{X}_j^T \bar{X}_j$ to state k (step 1408). Step 1408 may include generating a scaled product matrix $\bar{X}_{jk}^T \bar{X}_{jk}$, where the subscript jk indicates that the matrix includes sample data from state j scaled with respect to state k. In some embodiments, the scaled product matrix $\bar{X}_{jk}^T \bar{X}_{jk}$ is generated by scaling the sample matrix $X_j$ to state k using the following equation:

$$\bar{X}_{jk} = (X_j - 1_{m_j} b_k^T) V_k^{-1}$$

where $V_k$ is the standard deviation for state k, $b_k$ is the mean for state k, and the matrix $\bar{X}_{jk}$ is the sample matrix $X_j$ scaled with respect to operating state k. The transpose of the scaled sample matrix $\bar{X}_{jk}$ may then be multiplied by the scaled sample matrix $\bar{X}_{jk}$ to calculate the scaled product matrix $\bar{X}_j^T \bar{X}_j$.

In some embodiments, step 1408 includes generating the scaled product matrix $\bar{X}_{jk}^T \bar{X}_{jk}$ using the following equation:

$$\bar{X}_{jk}^T \bar{X}_{jk} = V_k^{-1}(X_j^T - b_k 1_{m_j}^T)(X_j - 1_{m_j} b_k^T) V_k^{-1}$$

$$\bar{X}_{jk}^T \bar{X}_{jk} = V_k^{-1}(X_j^T X_j + m_j(b_j - b_k)(b_j - b_k)^T - m_j b_j b_j^T) V_k^{-1}$$

where $V_k$ is the standard deviation for state k, $b_k$ is the mean for state k, $b_j$ is the mean for state j, $m_j$ is the number of samples in the sample vector $X_j$, and the vector $1_{m_j}$ is a ones vector of length $m_j$ (i.e., $1_{m_j} = [1_1 \ldots 1_{m_j}]$).

Still referring to FIG. 14, process 1400 is shown to include determining the direction $\theta_{jk}$ of state j with respect to state k (step 1410). In some embodiments, step 1410 is performed by direction extractor 526, as described with reference to FIG. 11. Determining the direction $\theta_{jk}$ may include performing singular value decomposition (SVD) on the scaled sample matrix $\bar{X}_{jk}$. For example, step 1410 may include factoring the scaled sample matrix $\bar{X}_{jk}$ as shown in the following equation:

$$\bar{X}_{jk} = L_{jk} D_{jk} L_{jk}^T$$

where the matrix $L_{jk}$ consists of n singular vectors $L_{jk} = [l_1\ l_2 \ldots l_n]$. Step 1410 may include extracting the direction $\theta_{jk}$ from the matrix $L_{jk}$. In some embodiments, step 1410 includes selecting the left or right singular vector in $L_{jk}$ as the direction $\theta_{jk}$ (e.g., $\theta_{jk} = [l_1]$ or $\theta_{jk} = [l_n]$).

In some embodiments, step 1410 includes selecting the first l singular vectors in $L_{jk}$ as the direction $\theta_{jk}$, where l is the number of singular vectors that brings the fault detection index of all of the reconstructed samples $z_{jk}$ within the control limit $\zeta_k^2$ (e.g., $\theta_{jk}=[l_1\ l_2\ \ldots\ l_l]$). The reconstructed samples $z_{jk}$ may be generated by sample reconstructor 536 by reconstructing each of the samples in $\overline{X}_{jk}$ along the direction $\theta_{jk}$ (e.g., by subtracting a multiple of $\theta_{jk}$ from each sample, described in greater detail below). The notation $z_{jk}$ indicates that a sample $x_j$ from state j is scaled with respect to state k and reconstructed along the direction $\theta_{jk}$ of state j from the perspective of state k.

In some embodiments, step 1410 includes augmenting $\theta_{jk}$ with the next singular vector in $L_{jk}$ until the direction $\theta_{jk}$ causes the fault detection indices of all the reconstructed samples $z_{jk}$ to be within the control limit $\zeta_k^2$. For example, step 1410 may include initially selecting $\zeta_{jk}=[l_1]$. Step 1410 may include reconstructing all of the samples $\overline{X}_{jk}$ along the direction $\zeta_{jk}=[l_1]$ to generate reconstructed samples $z_{jk}$. Step 1410 may include calculating fault detection indices $I(z_{jk})$ of the reconstructed samples $z_{jk}$, which may be compared with the control limit $\zeta_k^2$. If the fault detection indices $I(z_{jk})$ of all the reconstructed samples are within the control limit $\zeta_k^2$, step 1410 may include determining that $\theta_{jk}=[l_1]$. If the fault detection indices $I(z_{jk})$ of all the reconstructed samples are not within the control limit $\zeta_k^2$, step 1410 may include augmenting $\theta_{jk}$ with the next singular vector in $L_{jk}$ (e.g., $\theta_{jk}=[l_1\ l_2]$). This process may be repeated until the fault detection indices of all of the samples $z_{jk}$ reconstructed along direction $\theta_{jk}$ are within the control limit $\theta_k^2$.

In some embodiments, step 1410 uses a simplified direction extraction process based on the observation that the right singular vectors of $\overline{X}_{jk}$ and $\overline{X}_{jk}^T\overline{X}_{jk}$ are the same. For example, step 1410 may include performing singular value decomposition on the smaller matrix $\overline{X}_{jk}^T\overline{X}_{jk}$ as shown in the following equation:

$$\overline{X}_{jk}^T\overline{X}_{jk}=L_{jk}D_{jk}^2L_{jk}^T$$

where the matrix $L_{jk}$ consists of n singular vectors $L_{jk}=[l_1\ l_2\ \ldots\ l_n]$. Step 1410 may include extracting the direction $\theta_{jk}$ from the matrix $L_{jk}$ as previously described. For example, step 1410 may include initially selecting $\theta_{jk}=[l_1]$ and iteratively augmenting $\theta_{jk}$ with the next singular vector in $L_{jk}$ (e.g., $\theta_{jk}=[l_1\ l_2]$, $\theta_{jk}=[l_1\ l_2\ l_3]$, etc.) until the direction $\theta_{jk}$ causes the fault detection indices of all the reconstructed samples $z_{jk}$ to be within the control limit $\zeta_k^2$.

In some embodiments, step 1410 uses a further simplified direction extraction process based on the observation that when all of the fault detection indices $I(z_{jk})$ of the reconstructed samples are less than or equal to the control limit $\zeta_k^2$, the sum of all these indices will be less than the control limit $\zeta_k^2$ multiplied by the number of samples m in the scaled sample matrix $\overline{X}_{jk}$. This relationship is shown in the following equation:

$$\sum_{k=1}^{m} x_k^T Q_{jk} x_k \leq m\zeta_k^2$$

where the product $x_k^T Q_{jk} x_k = I(z_{jk})$. Step 1410 may include calculating the matrix $Q_{jk}$ as follows:

$$Q_{jk}=M-M\theta_{jk}(\theta_{jk}^T M\theta_{jk})^{-1}\theta_{jk}^T M$$

where M is calculated based on the model parameters for state k.

Step 1410 may include applying the trace operator to the sum $\sum_{k=1}^{m} x_k^T Q_{jk} x_k$ and simplifying the preceding inequality as follows:

$$tr\left\{\sum_{k=1}^{m} x_k^T Q_{jk} x_k\right\} \leq m\zeta_k^2$$

$$\sum_{k=1}^{m} tr\{x_k^T Q_{jk} x_k\} \leq m\zeta_k^2$$

$$\sum_{k=1}^{m} tr\{Q_{jk} x_k x_k^T\} \leq m\zeta_k^2$$

$$tr\left\{Q_{jk}\sum_{k=1}^{m} x_k x_k^T\right\} \leq m\zeta_k^2$$

$$tr\{Q_{jk}\overline{X}_{jk}^T\overline{X}_{jk}\} \leq m\zeta_k^2$$

$$tr\{Q_{jk}\overline{S}_{jk}\} \leq \zeta_k^2$$

where $\overline{S}_{jk}$ is the covariance of the scaled sample matrix $\overline{X}_{jk}$ $$\left(\text{i.e., } \overline{S}_{jk}=\frac{1}{m}\overline{X}_{jk}^T\overline{X}_{jk}\right).$$

Advantageously, this formulation allows process 1400 determine the number l of singular vectors in $\theta_{jk}$ using only the trace of the product $Q_{jk}\overline{S}_{jk}$ and the control limit $\zeta_k^2$. For example, step 1410 may include initially selecting $\theta_{jk}=[l_1]$ and iteratively augmenting $\theta_{jk}$ with the next singular vector in $L_{jk}$ (e.g., $\theta_{jk}=[l_1\ l_2]$, $\theta_{jk}=[l_1\ l_2\ l_3]$, etc.) until the direction $\theta_{jk}$ causes the trace of $Q_{jk}\overline{S}_{jk}$ to be within the control limit $\zeta_k^2$ (i.e., $tr\{Q_{jk}\overline{S}_{jk}\}\leq\zeta_k^2$).

Still referring to FIG. 14, process 1400 is shown to include reconstructing the scaled sample $\overline{x}_k$ along the direction $\theta_{jk}$ (step 1412). In some embodiments, step 1412 is performed by sample reconstructor 536, as described with reference to FIG. 11. Step 1412 may include characterizing samples $\overline{x}_k$ of the monitored variables as having a fault-free part $x_k^*$ and a faulty part $f\theta$ with respect to a particular operating state. For example, each sample can be broken into parts, as shown in the following equation:

$$\overline{x}_k=x_k^*+f\theta$$

where the fault-free part $x_k^*$ is representative of a sample from the operating state (e.g., the mean $b_k$ of state k) and the faulty part consists of a fault magnitude f and a fault direction $\theta$. In some embodiments, step 1412 includes finding the value $f_{jk}$ that minimizes the fault detection index of the reconstructed sample $z_{jk}$, where $z_{jk}$ is defined as follows:

$$z_{jk}=\overline{x}_k-f_{jk}\theta_{jk}$$

Process 1400 is shown to include generating an index $I(z_{jk})$ of the reconstructed sample (step 1414). In some embodiments, step 1414 includes calculating the fault detection index $I(z_{jk})$ using the following equation:

$$I(z_{jk})=\overline{x}_k^T(M-M\theta_{jk}(\theta_{jk}^T M\theta_{jk})^{-1}\theta_{jk}^T M)\overline{x}_k=\overline{x}_k^T Q_{jk}\overline{x}_k$$

where $Q_{jk}=M-M\theta_{jk}(\theta_{jk}^T M\theta_{jk})^{-1}\theta_{jk}^T M$ and M is calculated based on the model parameters for state k.

Still referring to FIG. 14, process 1400 is shown to include comparing the fault detection index $I(z_{jk})$ to the control limit $\zeta_k^2$ for state k (step 1416). If the index $I(z_{jk})$ for a particular sample reconstructed along the direction $\theta_{jk}$ to state j is within the control limit for operating state k (i.e., $I(z_{jk})\leq\zeta_k^2$ and the result of step 1416 is "yes"), process 1400 may record a vote for state j as the current operating state (step 1418). Recording a vote for state j as the current operating state indicates that the direction of the sample x from the perspective of state k is the same or similar to the direction $\theta_{jk}$ of state j from the perspective of state k. Recording a vote for state j as the current operating state may include storing a value $V_{jk}=1$, where k is the identifier of the base state selected in step 1404 and j is the identifier of the potential operating state selected in step 1406.

However, if the index $I(z_{jk})$ of the scaled reconstructed sample is not within the control limit for operating state k (i.e., $I(z_{jk})>\zeta_k^2$ and the result of step 1416 is "no"), process 1400 may record a vote for state j as not the current operating state. Recording a vote for state j as not the current operating state indicates that the direction of the sample x from the perspective of state k is not the same or similar to the direction $\theta_{jk}$ of state j from the perspective of state k. In some embodiments, process 1400 stores a value $V_{jk}=0$ when a vote is recorded for state j as not the current operating state from the perspective of state k. Process 1400 may then proceed to step 1420.

Process 1400 is shown to include determining whether all states j≠k have been tested (step 1420). Step 1420 may include determining whether steps 1406-1418 have been performed for each state j for a given base state k. As previously described, state j may be any of the stored operating states other than state k. If not all states j≠k have been tested (i.e., the result of step 1420 is "no"), process 1400 may return to step 1406 and select the next state j≠k. Steps 1406-1420 may be repeated until each state j has been evaluated for a given base state k. Each iteration of steps 1406-1420 may result in a vote being recorded for one or more of states j from the perspective of state k. The vote may be an affirmative vote for state j (e.g., $V_{jk}=1$) or a non-affirmative vote for state j (e.g., $V_{jk}=0$). Affirmative votes indicate that state j has the same or similar direction as the sample x from the perspective of state k, whereas non-affirmative votes indicate that state j does not have the same or similar direction as the sample x from the perspective of state k. Once all states j≠k have been tested (i.e., the result of step 1420 is "yes"), process 1400 may proceed to step 1422.

Still referring to FIG. 14, process 1400 is shown to include determining whether any affirmative votes have been recorded from the perspective of base state k (step 1422). In some embodiments, step 1422 includes adding all of the votes from the perspective of base state k as shown in the following equation:

$$\sum_{j=1}^{J} V_{jk}$$

where J is the total number of states j other than state k (i.e., one less than the total number of stored states) and $V_{jk}$ is a variable representing the value of the vote for state j from the perspective of state k. $V_{jk}$ may have a value of zero (i.e., $V_{jk}=0$) if state k did not record an affirmative vote for state j, or non-zero if state k did record an affirmative vote for state j (e.g., $V_{jk}=1$). This formulation allows process 1400 to determine whether any of the votes from the perspective of state k were affirmative. In other words, this formulation allows process 1400 to determine whether any of the tested states j have the same or similar direction $\theta_{jk}$ as the sample x from the perspective of state k.

Process 1400 is shown to include recording a vote for an unknown state (step 1424). Step 1424 may be performed in response to a determination in step 1422 that none of the votes from the perspective of state k were affirmative (i.e., $\Sigma_{j=1}^{J} V_{jk}=0$ and the result of step 1422 is "yes"). This situation may occur when none of the stored operating states j have the same or similar direction as the sample x from the perspective of state k. Process 1400 may proceed to step 1426 after recording a vote for an unknown state. If any of the states j received an affirmative vote from the perspective of state k (i.e., $\Sigma_{j=1}^{J} V_{jk} \neq 0$ and the result of step 1422 is "no"), process 1400 may proceed directly to step 1426 without recording a vote for the unknown state.

Still referring to FIG. 14, process 1400 is shown to include determining whether all states k have been tested (step 1426). Step 1426 may include determining whether steps 1404-1424 have been performed for each state k in the library of stored operating states. If not all states k have been tested (i.e., the result of step 1426 is "no"), process 1400 may return to step 1404 and select the next state k. Steps 1404-1426 may be repeated until each state k has been evaluated. Each iteration of steps 1404-1426 may evaluate one or more of the other states j relative to a base state k. In some embodiments, all of the other states j are evaluated relative to each base state k (e.g., recording an affirmative or non-affirmative vote for each state j from the perspective of base state k). In other embodiments, the other states j are evaluated only until an affirmative vote is recorded, at which point process 1400 proceeds directly to step 1426 without evaluating the remaining states j. Once all states k have been tested (i.e., the result of step 1426 is "yes"), process 1400 may proceed to step 1428.

Process 1400 is shown to include identifying the state j with the most votes as the current operating state (step 1428). Step 1428 may include counting the number of votes for each of the stored operating states j and for the unknown state. In some embodiments, step 1428 counts votes using the following counting algorithm:

$$V_j^T = \sum_{k=1}^{N} V_{jk}$$

where $V_j^T$ is a variable representing the cumulative number of votes for state j recorded during all of the iterations of steps 1404-1426. The variable $V_{jk}$ may have a non-zero value (e.g., $V_{jk}=1$) if an affirmative vote was recorded in step 1418 for state j from the perspective of state k, or a zero value (i.e., $V_k=0$) if a non-affirmative vote (or no vote) was recorded state j from the perspective of state k. The summation shown in the previous equation adds all of the votes for state j from the perspectives of each of the N operating states.

In some embodiments, process 1400 includes generating a control signal for building equipment based on the current operating state. The control signal may be generated by a building controller and may be used by the building equipment to affect a variable state or condition within the building (e.g., temperature, humidity, airflow, etc.). The current operating state may be used to select a control algorithm, select control parameters, select an operating mode, or otherwise affect the process by which control signals are generated. For example, a different models may be used to control the building equipment when the building equipment is operating in different states. The current operating state allows the building controller to determine which model to use as a basis for generating the control signals for the building equipment. The control signals may be provided to the building equipment and used to operate the building equipment. Operating the building equipment may affect a variable state or condition in the building (e.g., one or more of the monitored variables)

Advantageously, process 1400 improves the accuracy of the state identification for a given sample x of the monitored variables by allowing each operating state to vote for one or more of the other operating states. Each operating state k may vote for one or more of the other operating states j that have the same or similar direction as the sample x from the perspective of state k. Process 1400 takes advantage of the fact that each of the operating states k has a different perspective in order to provide information from the perspective of one operating state that might not be available from the perspective of another of the operating states. For example, referring again to FIG. 10A, state 1 may be unable to distinguish between samples x within state 3 and samples x within state 5 because both states 3 and 5 have similar directions (i.e., $\theta_2$ and $\theta_4$, respectively) from the perspective of state 1. However, as shown in FIG. 10B, state 4 has a different perspective and can more easily distinguish between states 3 and 5 because states 3 and 5 have significantly different directions (i.e., $\psi_3$ and $\psi_4$, respectively) from the perspective of state 4. In this situation, state 1 might vote for both states 3 and 5. However, state 4 might vote for only state 3. The additional information provided by the perspective of state 4 allows FDD system 502 to accurately identify various operating states.

Example Implementation: Centrifugal Chiller

Figure 15:
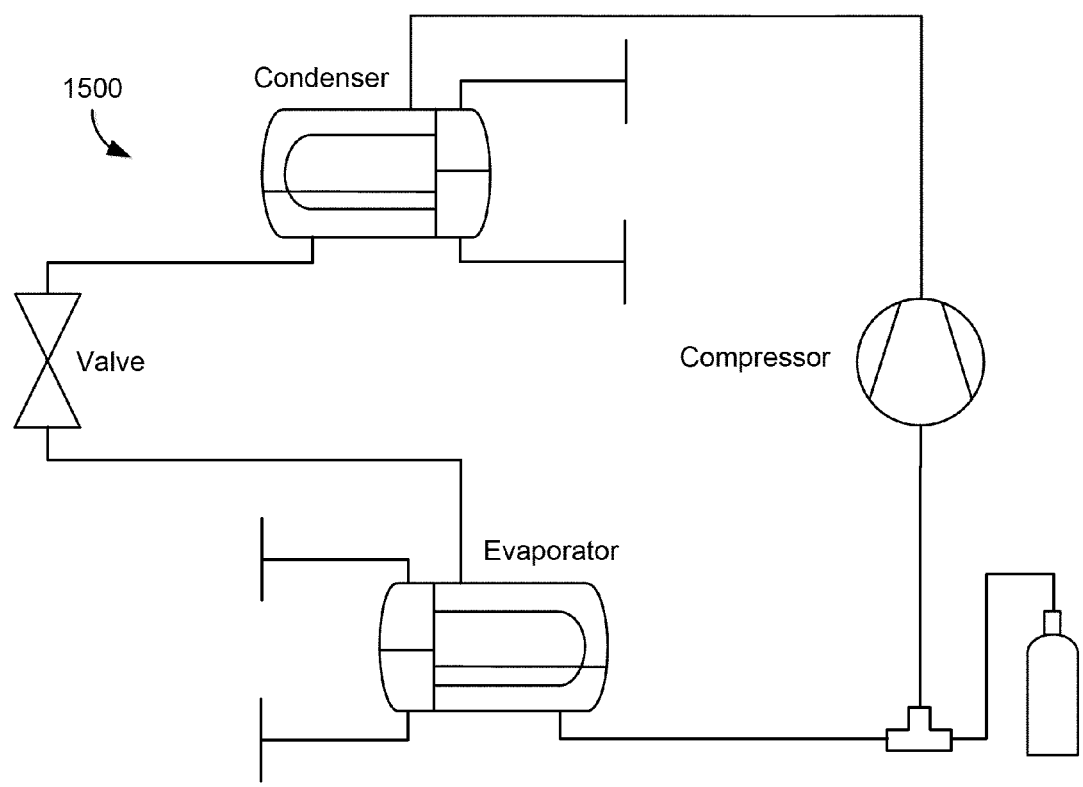
FIG. 15 is a schematic diagram of a chiller for which a set of PCA models can be constructed and the current operating state can be identified using the systems and processes of FIGS. 1-14, according to an exemplary embodiment.

Referring now to FIG. 15, an exemplary implementation of the present invention is provided. FIG. 15 is a schematic diagram of a centrifugal chiller 1500. In some embodiments, the voting-based fault detection and diagnostic systems and methods described herein may be used to determine an operating state of chiller 1500 or other types of chillers in a HVAC system or refrigeration system. In other embodiments, the systems and methods of the present invention can be used to detect and diagnose the operating state of any type of controlled system, process, or device, and are not limited to chillers or any other particular type of building equipment.

Chiller 1500 is shown as a refrigeration circuit including a condenser, an expansion valve, an evaporator, and a compressor. In some embodiments, chiller 1500 includes sensors that measure a set of monitored variables at various locations along the refrigeration circuit. Table 1 describes an exemplary set of monitored variables that can be measured in chiller 1500. FDD system 502 may use these variables as monitored variables 506 to detect and/or diagnose the current operating state of chiller 1500.

TABLE 1

Monitored Chiller Variables

| Number | ID | Description | Units |
|---|---|---|---|
| 1 | $F_{cw}$ | Condenser water flow rate | kg/s |
| 2 | $F_r$ | Refrigerant charge | kg |
| 3 | $F_{ew}$ | Evaporator water flow rate | kg/s |
| 4 | $T_{cir}$ | Condenser inlet refrigerant temperature | K |
| 5 | $A_v$ | Valve position | m$^2$ |
| 6 | $P_e$ | Evaporator pressure | Pa |
| 7 | $P_c$ | Condenser pressure | Pa |
| 8 | $W_{com}$ | Compressor power | Watts |
| 9 | $T_{eow}$ | Evaporator outlet water temperature | K |
| 10 | $T_{cow}$ | Condenser outlet water temperature | K |
| 11 | $T_{eiw}$ | Evaporator inlet water temperature | K |

TABLE 1-continued

Monitored Chiller Variables

| Number | ID | Description | Units |
|---|---|---|---|
| 12 | $T_{ciw}$ | Condenser inlet water temperature | K |
| 13 | $T_{eor}$ | Evaporator outlet refrigerant temperature | K |
| 14 | $T_{cor}$ | Condenser outlet refrigerant temperature | K |
| 15 | $T_{eir}$ | Evaporator inlet refrigerant temperature | K |

Chiller 1500 may be configured to operate in multiple different operating states. For example, chiller 1500 may be operated in a low load state, a medium load state, and a high load state. These three states represent the normal operating states or conditions of chiller 1500. The evaporator inlet water temperature $T_{eiw}$ may be different in the normal operating states. For example, the value for $T_{eiw}$ may have a first value in the low load state (e.g., 280 K), a second value in the medium load state (e.g., 282 K), and a third value in the high load state (e.g., 284 K).

Faults in chiller 1500 may cause the operation of chiller 1500 to deviate from the normal operating states. For example, three types of faults may occur in each of the normal operating states. These correspond to leaks in the condenser water flow $F_{cw}$, the evaporator water flow $F_{ew}$, and the refrigerant charge $F_r$. For each type of fault, several different fault levels may exist. For example, the fault levels may correspond to reductions in the values of the affected flow variables by 10%, 20%, 30%, and 40%. The combination of the three normal chiller load states, the three fault types for each normal load state, and the four fault levels for each fault type leads to a total of 39 operating states. Table 2 illustrates these operating states.

TABLE 2

Chiller Operating States

| Load | | | | | Leak Percent | | |
|---|---|---|---|---|---|---|---|
| Low | Medium | High | | Type | $F_{cw}$ | $F_r$ | $F_{ew}$ |
| | State ID | | | | | | |
| 1 | 14 | 27 | | Normal | 0 | 0 | 0 |
| 2 | 15 | 28 | | Faulty | 10 | 0 | 0 |
| 3 | 16 | 29 | | | 20 | | |
| 4 | 17 | 30 | | | 30 | | |
| 5 | 18 | 31 | | | 40 | | |
| 6 | 19 | 32 | | | 0 | 10 | |
| 7 | 20 | 33 | | | | 20 | |
| 8 | 21 | 34 | | | | 30 | |
| 9 | 22 | 35 | | | | 40 | |
| 10 | 23 | 36 | | | | 0 | 10 |
| 11 | 24 | 37 | | | | | 20 |
| 12 | 25 | 38 | | | | | 30 |
| 13 | 26 | 39 | | | | | 40 |

FDD system 502 may build PCA models of the operating states by collecting samples of the monitored variables. For example, FDD system 502 may collect 1000 samples of the monitored variables at a rate of one sample per second. The samples taken at each sampling time can be organized into a vector, as shown in the following equation:

$$x = [F_{cw}\ F_r\ \ldots\ T_{eir}]^T$$

The samples x of monitored variables may be passed to data scaler 520, PCA modeler 528, and other components of FDD system 502 and used to construct PCA models for each of the operating states, as described with reference to FIGS. 11-12. After the state models are built, new samples x of the monitored variables can be processed by FDD system 502 to determine the current operating state of chiller 1500, as described with reference to FIGS. 11 and 13-14.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
   building equipment that operate to affect a variable state or condition within a building, the building equipment configured to operate in at least a first operating state and a second operating state;
   a plurality of sensors configured to measure a plurality of monitored variables that result from operating the building equipment; and
   a fault detection and diagnosis (FDD) system comprising:
      a communications interface configured to receive samples of the monitored variables from the plurality of sensors; and
      a processing circuit comprising:
         a direction extractor configured to use locations, in a multidimensional modeling space, of a plurality of stored operating states to extract a direction from each of the stored operating states to each of the other stored operating states;
         a fault diagnoser configured to use the extracted directions in a voting-based diagnosis to determine an operating state for each of the samples of the monitored variables; and
         a controller configured to operate the building equipment in the first operating state in response to a determination by the voting-based diagnosis that the operating state is the first operating state for at least one of the samples of the monitored variables, the controller configured to operate the building equipment in the second operating state in response to a determination by the voting-based diagnosis that the operating state is the second operating state for at least one of the samples of the monitored variables.

2. The BMS of claim 1, wherein the voting-based diagnosis comprises:
   iteratively selecting each of the stored operating states;
   recording, for each selected operating state, a vote for one or more of the other operating states for which the direction from the selected operating state to the other operating state is similar to a direction from the selected operating state to the sample; and
   identifying the sample as belonging to the operating state with the most votes.

3. The BMS of claim 1, wherein the processing circuit further comprises a modeler configured to generate a plurality of models describing the plurality of stored operating states, each model defining the location of one of the stored operating states in the multidimensional modeling space.

4. The BMS of claim 3, wherein the plurality of models are principal component analysis models, each principal component analysis model describing a corresponding operating state using a plurality of model parameters comprising:
   a mean and standard deviation of a set of training samples associated with the corresponding operating state; and
   a control limit for the corresponding operating state.

5. The BMS of claim 1, wherein the processing circuit further comprises a data scaler configured to use modeling parameters describing the plurality of stored operating states to scale the samples to each of the stored operating states.

6. The BMS of claim 5, wherein the processing circuit further comprises a sample indexer configured to generate indices for the scaled samples using the modeling parameters describing the stored operating state to which the samples are scaled.

7. The BMS of claim 6, wherein the processing circuit further comprises a fault detector configured to:
   compare the generated sample indices with a control limit for the stored operating state to which the samples are scaled; and
   identify the samples as belonging to the stored operating state in response to the generated sample indices being within the control limit.

8. The BMS of claim 5, wherein the processing circuit further comprises a sample reconstructor configured to reconstruct the samples along each of the directions from a stored operating state to each of the other stored operating states.

9. The BMS of claim 8, wherein fault diagnoser is configured to:
compare a sample index for each reconstructed sample with a control limit for the stored operating state to which the sample is scaled; and
identify the sample as belonging to a stored operating state corresponding to the direction along which the sample is reconstructed in response to the sample index being within the control limit.

10. A fault detection and diagnosis system (FDD) comprising:
a processing circuit comprising:
a variable monitor configured to monitor a plurality of variables that result from operating building equipment in a building management system and to generate a sample comprising values for each of the monitored variables;
a direction extractor configured to use locations of a plurality of stored operating states in a multidimensional modeling space to extract a direction from each of the stored operating states to each of the other stored operating states;
a fault diagnoser configured to identify the sample as belonging to a particular operating state using a voting-based diagnosis comprising each of the stored operating states voting for one or more other operating states based on the directions of the other operating states relative to a direction of the sample from a perspective of the stored operating state; and
a controller configured to operate the building equipment in a first state in response to the voting-based diagnosis identifying that the particular operating state is the first state, the controller configured to operate the building equipment in a second state in response to the voting-based diagnosis identifying that the particular operating state is the second state.

11. The FDD system of claim 10, wherein the voting-based diagnosis comprises:
iteratively selecting each of the stored operating states;
recording, for each selected operating state, a vote for one or more of the other operating states for which the direction from the selected operating state to the other operating state is similar to the direction from the selected operating state to the sample; and
identifying the sample as belonging to the operating state with the most votes.

12. The FDD system of claim 10, wherein the fault diagnoser is configured to:
record a vote for one or more of the other stored operating states in response to a determination that the directions of the one or more other stored operating states are similar to the direction of the sample; and
record a vote for an unknown operating state in response to a determination that none of the directions of the other stored operating states are similar to the direction of the sample.

13. The FDD system of claim 10, the processing circuit further comprising a modeler configured to generate a plurality of models describing the plurality of stored operating states, each model defining the location of a stored operating state in the multidimensional modeling space.

14. The FDD system of claim 10, the processing circuit further comprising a data scaler configured to use modeling parameters describing the plurality of stored operating states to scale the sample to each of the stored operating states.

15. The FDD system of claim 14, the processing circuit further comprising a sample indexer configured to generate a sample index for each scaled sample using the modeling parameters describing the stored operating state to which the sample is scaled.

16. The FDD system of claim 15, the processing circuit further comprising a fault detector configured to:
compare the generated sample index with a control limit for the stored operating state to which the sample is scaled; and
identify the sample as belonging to the stored operating state to which the sample is scaled in response to the generated sample index being within the control limit.

17. The FDD system of claim 16, wherein:
the data scaler is configured to scale the sample to each of the plurality of stored operating states;
the fault detector is configured to determine whether each of the scaled samples belongs to the stored operating state to which the sample is scaled; and
the fault diagnoser is configured to perform the voting-based fault diagnosis in response to the fault detector failing to identify the sample as belonging to any of the stored operating states.

18. The FDD system of claim 14, the processing circuit further comprising a sample reconstructor configured to reconstruct each scaled sample along the directions from a stored operating state to each of the other stored operating states.

19. The FDD system of claim 18, the processing circuit further comprising a sample indexer configured to generate a sample index for each reconstructed sample using the modeling parameters describing the stored operating state to which the sample is scaled.

20. The FDD system of claim 19, wherein the fault diagnoser is configured to:
compare the sample index for each reconstructed sample with a control limit for the stored operating state to which the sample is scaled; and
identify the sample as belonging to the stored operating state corresponding to the direction along which the sample is reconstructed in response to the sample index being within the control limit.

* * * * *